United States Patent
Li

(10) Patent No.: US 9,372,898 B2
(45) Date of Patent: Jun. 21, 2016

(54) ENABLING EVENT PREDICTION AS AN ON-DEVICE SERVICE FOR MOBILE INTERACTION

(71) Applicant: Google Inc., Mountain View, CA (US)

(72) Inventor: Yang Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 47 days.

(21) Appl. No.: 14/334,631

(22) Filed: Jul. 17, 2014

(65) Prior Publication Data

US 2016/0019460 A1    Jan. 21, 2016

(51) Int. Cl.
G06F 17/30 (2006.01)
G06F 9/54 (2006.01)
G06N 7/00 (2006.01)

(52) U.S. Cl.
CPC ........... G06F 17/3053 (2013.01); G06F 9/542 (2013.01); G06N 7/005 (2013.01)

(58) Field of Classification Search
None
See application file for complete search history.

(56) References Cited

U.S. PATENT DOCUMENTS

| | | | |
|---|---|---|---|
| 5,493,729 A * | 2/1996 | Nigawara | G06N 5/04 706/52 |
| 8,412,648 B2 | 4/2013 | Karypis et al. | |
| 8,539,038 B2 | 9/2013 | Jones et al. | |
| 8,566,258 B2 | 10/2013 | Pachet et al. | |
| 2005/0234848 A1 * | 10/2005 | Lawrence | G06F 17/30864 |
| 2006/0059112 A1 | 3/2006 | Cheng et al. | |
| 2008/0114574 A1 * | 5/2008 | Chen | G06F 19/345 703/2 |
| 2008/0120257 A1 | 5/2008 | Goyal et al. | |
| 2009/0113248 A1 * | 4/2009 | Bock | G06F 11/0748 714/39 |
| 2009/0287625 A1 * | 11/2009 | Fablet | G06F 17/2247 706/45 |
| 2010/0131952 A1 * | 5/2010 | Akiyama | G06F 11/0748 718/100 |
| 2012/0254078 A1 | 10/2012 | Bhatnagar et al. | |
| 2012/0323827 A1 | 12/2012 | Lakshmanan et al. | |
| 2013/0117108 A1 * | 5/2013 | Spears | G06Q 30/0255 705/14.53 |
| 2013/0185232 A1 * | 7/2013 | Hochstein | G06N 7/005 706/12 |
| 2014/0075004 A1 | 3/2014 | Van Dusen et al. | |
| 2014/0120891 A1 * | 5/2014 | Chen | H04W 4/001 455/418 |

OTHER PUBLICATIONS

Apple Inc., "Siri. Your wish is its command", Sep. 9, 2014, available from the Internet at www.apple.com/ios/siri/ (last visited Sep. 24, 2014).

(Continued)

*Primary Examiner* — Tuan Dao
(74) *Attorney, Agent, or Firm* — McDonnell Boehnen Hulbert & Berghoff LLP

(57) ABSTRACT

By knowing which upcoming actions a user might perform, a mobile application can optimize a user interface or reduce the amount of user input needed for accomplishing a task. A herein-described prediction module can answer queries from a mobile application regarding which actions in the application the user is likely to perform at a given time. Any application can register and communicate with the prediction module via a straightforward application programming interface (API). The prediction module continuously learns a prediction model for each application based on the application's evolving event history. The prediction module generates predictions by combining multiple predictors with an online learning method, and capturing event patterns not only within but also across registered applications. The prediction module is evaluated using events collected from multiple types of mobile devices.

20 Claims, 9 Drawing Sheets

(56) References Cited

OTHER PUBLICATIONS

M Bohmer et al. Falling asleep with Angry Birds, Facebook and Kindle: a large scale study on mobile application usage, Proceedings of the 13th International Conference on Human Computer Interaction with Mobile Devices and Services (MobileHCI'11), Aug. 30, 2011, pp. 47-56.
R. Brindle et al., Inducing shortcuts on a mobile phone interface, Proceedings of the 11th international conference on Intelligent user interfaces (IUI'06), Jan. 29, 2006, pp. 327-329.
C. Cortes et al., Support-Vector Networks, Machine Learning, Sep. 1, 1995, pp. 273-297, vol. 20, Issue 3.
K. Crammer et al., Online Passive-Aggressive Algorithms, The Journal of Machine Learning Research, 2006, vol. 7, pp. 551-585.
A.K. Dey et al., A Conceptual Framework and a Toolkit for Supporting the Rapid Prototyping of Context-Aware Applications, Human-Computer Interaction, Dec. 2001, vol. 16, Issue 2, pp. 97-166.
S. Fitchett et al., AccessRank: predicting what users will do next, May 5, 2012, Proceedings of the SIGCHI Conference on Human Factors in Computing Systems 2012 (CHI '12), pp. 2239-2242.
S. Fitchett et al.,Improving navigation-based file retrieval, Apr. 27, 2013, Proceedings of the SIGCHI Conference on Human Factors in Computing Systems 2013 (CHI'13), pp. 2329-2338.
Y. Fukazawa et al., Automatic mobile menu customization based on user operation history, Sep. 15, 2009, Proceedings of the 11th International Conference on Human-Computer Interaction with Mobile Devices and Services (MobileHCI'09), Article No. 50.
J. I. Hong et al., An Architecture for Privacy-Sensitive Ubiquitous Computing, Jun. 6, 2004, Proceedings of the 2nd international conference on Mobile systems, applications, and services (Mobisys'04), pp. 177-189.
H. Lee et al., An adaptive user interface based on spatiotemporal structure learning, Jun. 2011, IEEE Communications Magazine 2011, pp. 118-124, vol. 49, Issue 6.
S. Lee et al., An adaptive speed-call list algorithm and its evaluation with ESM, Apr. 10, 2010, Proceedings of the SIGCHI Conference on Human Factors in Computing Systems 2010 (CHI'10), pp. 2019-2022.
J. Liu et al., Spatio-temporal Semantic Features for Human Action Recognition, Oct. 2012, Transactions on Internet and Information Systems, pp. 2632-2649, vol. 6, No. 10.
J. F. Murray et al., Machine Learning Methods for Predicting Failures in Hard Drives: A Multiple-Instance Application, Journal of Machine Learning Research, May 2005, pp. 783-816, vol. 6.
A. Parate et al., Practical prediction and prefetch for faster access to applications on mobile phones, Sep. 8, 2013, ACM International Joint Conference on Pervasive and Ubiquitous Computing (UbiComp'13), pp. 275-284.
A. Rahmati et al., Practical context awareness: measuring and utilizing the context dependency of mobile usage, Aug., 2012, Technical Report 2012-08-312012, Rice University.
T. Rattenbury et al., CAAD: An Automatic Task Support System, Apr. 28, 2007, Proceedings of the SIGCHI Conference on Human Factors in Computing Systems (CHI'07), pp. 687-696.
A. Sears et al., Split menus: effectively using selection frequency to organize menus, Mar. 1994, ACM Transactions on Computer-Human Interaction (TOCHI), p. 27-51, vol. 1, Issue 1.
S. Shalev-Shwartz et al., Efficient Learning of Label Ranking by Soft Projections onto Polyhedra, Journal of Machine Learning Research, Jul. 2006, pp. 1567-1599, vol. 7.
C. Shepard et al., LiveLab: measuring wireless networks and smartphone users in the field, Dec. 2010, ACM SIGMETRICS Performance Evaluation Review, pp. 15-20, vol. 38, Issue 3.
C Shin et al., Understanding and prediction of mobile application usage for smart phones, Sep. 5, 2012, ACM International Joint Conference on Pervasive and Ubiquitous Computing (UbiComp'12), pp. 173-182.
A. Vetek et al., SmartActions: Context-Aware Mobile Phone Shortcuts, Aug. 24, 2009, Proceedings of the 12th IFIP TC 13 International Conference on Human-Computer Interaction: Part I (INTERACT'09), pp. 796-799.
D.S. Weld et al., Automatically personalizing user interfaces, Aug. 9, 2003, Proceedings of the 18th international joint conference on Artificial intelligence (IJCAI'03), pp. 1613-1619.
Wikimedia Foundation, "Markov Chain", Sep. 20, 2014, available from the Internet at en.wikipedia.org/wiki/Markov_chain (last visited Sep. 24, 2014).
Wikimedia Foundation, "Perceptron", Sep. 2, 2014, available from the Internet at en.wikipedia.org/wiki/Perceptron (last visited Sep. 24, 2014).
T. Yan et al., Fast app launching for mobile devices using predictive user context, Jun. 25, 2012, Proceedings of the 10th international conference on Mobile systems, applications, and services (Mobisys'12), pp. 177-189.
J. Zhuang et al.,When recommendation meets mobile: contextual and personalized recommendation on the go, Sep. 5, 2012, ACM International Joint Conference on Pervasive and Ubiquitous Computing (UbiComp'11), pp. 153-162.
W. Ching et al., On multi-dimensional Markov chain models, Pacific Journal of Optimization, Jan. 2007, pp. 235-243, vol. 3, No. 2.

\* cited by examiner

ENABLING EVENT PREDICTION AS AN ON-DEVICE SERVICE FOR MOBILE INTERACTION

BACKGROUND

Unless otherwise indicated herein, the materials described in this section are not prior art to the claims in this application and are not admitted to be prior art by inclusion in this section.

Mobile devices are ubiquitous in modern communication networks. Many of these mobile devices are "smart phones" capable of running one or more applications while acting as a communication device. The applications can include, but are not limited to, telephony applications, e-mail applications, Web browsing applications, games, calendar applications, contact managers, and weather/news applications. In some cases, a user can use multiple applications during one session to interact with the smart phone.

SUMMARY

In one aspect, a method is provided. A prediction module of a computing device receives a plurality of event notifications associated with a plurality of applications. The plurality of applications include a first application and a second application, where the first application differs from the second application. The plurality of event notifications include a first event notification and a second event notification. The first event notification is associated with the first application and regards a first event. The second event notification is associated with the second application and regards a second event. The prediction module of the computing device determines a plurality of event-prediction features for the plurality of events. The plurality of event-prediction features include a given event-prediction feature. The given event-prediction feature includes a first value that is based on a probability of an occurrence of the first event given an occurrence of the second event. The prediction module of the computing device receives a query to predict an occurrence of the first event. After receiving the query, the prediction module of the computing device determines a score predicting the occurrence of the first event based on the plurality of event-prediction features. The prediction module of the computing device provides the score from the prediction module.

In another aspect, a computing device is provided. The computing device includes one or more processors and a non-transitory computer readable medium. The non-transitory computer readable medium is configured to store executable instructions for at least a prediction module. The executable instructions, when executed by the one or more processors, cause the computing device to perform functions including: receiving a plurality of event notifications associated with a plurality of applications at the prediction module, where the plurality of applications include a first application and a second application, where the first application differs from the second application, where the plurality of event notifications include a first event notification received from the first application regarding a first event and a second event notification received from the second application regarding a second event; determining a plurality of event-prediction features for the plurality of events at the prediction module, where the plurality of event-prediction features include a given event-prediction feature that includes a first value that is based on a probability of an occurrence of the first event given an occurrence of the second event; receiving, at the prediction module, a query to predict an occurrence of the first event; after receiving the query, determining a score predicting the occurrence of the first event based on the plurality of event-prediction features using the prediction module; and providing the score from the prediction module.

In another aspect, a non-transitory computer readable medium is provided. The non-transitory computer readable medium is configured to store at least executable instructions. The executable instructions, when executed by one or more processors of a computing device, cause the computing device to perform functions including: receiving a plurality of event notifications associated with a plurality of applications at a prediction module of the computing device, where the plurality of applications include a first application and a second application, where the first application differs from the second application, where the plurality of event notifications include a first event notification associated with the first application regarding a first event and a second event notification associated with the second application regarding a second event; determining a plurality of event-prediction features for the plurality of events at the prediction module, where the plurality of event-prediction features include a given event-prediction feature that includes a first value that is based on a probability of an occurrence of the first event given an occurrence of the second event; receiving a query to predict an occurrence of the first event at the prediction module; after receiving the query, determining a score predicting the occurrence of the first event based on the plurality of event-prediction features using the prediction module; and providing the score from the prediction module.

In another aspect, a computing device is provided. The computing device includes prediction module means. The prediction module means include: means for receiving a plurality of event notifications associated with a plurality of applications, where the plurality of applications include a first application and a second application, where the first application differs from the second application, where the plurality of event notifications include a first event notification associated with the first application regarding a first event and a second event notification associated with the second application regarding a second event; means for determining a plurality of event-prediction features for the plurality of events, where the plurality of event-prediction features include a given event-prediction feature that includes a first value that is based on a probability of an occurrence of the first event given an occurrence of the second event; means for receiving a query to predict an occurrence of the first event; means for, after receiving the query, determining a score predicting the occurrence of the first event based on the plurality of event-prediction features; and means for providing the score.

DETAILED DESCRIPTION

Figure 1:
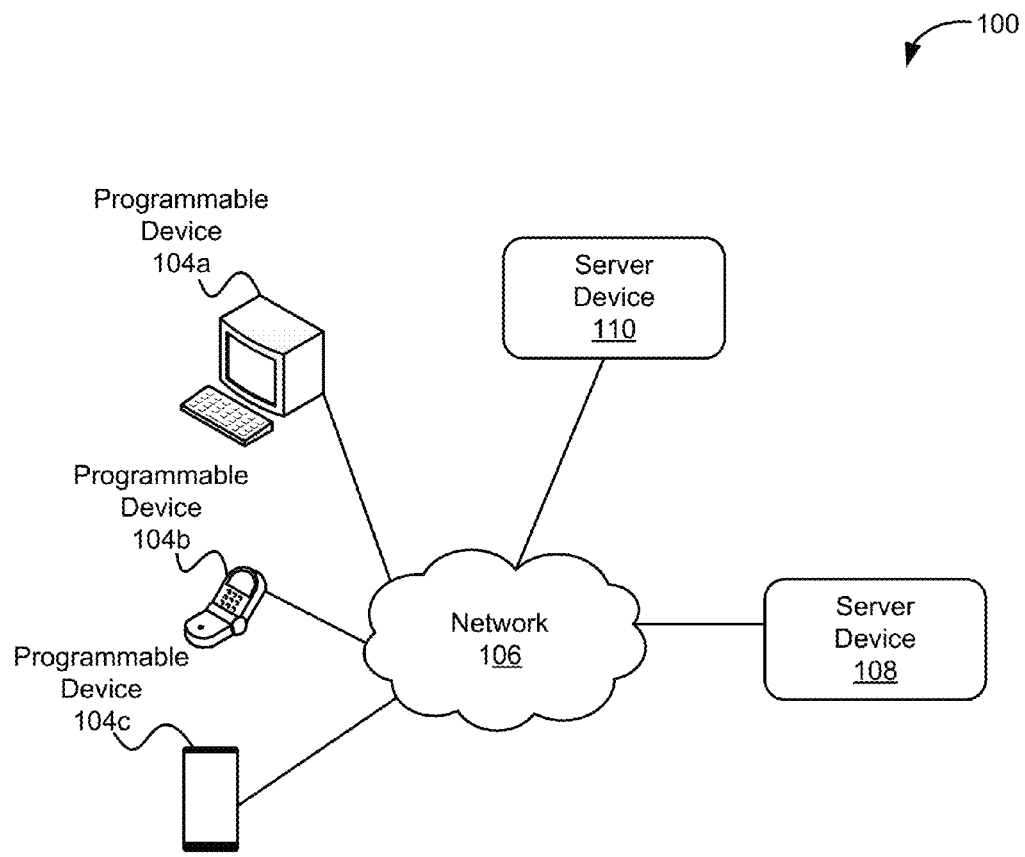
FIG. 1 depicts an example data network, in accordance with an embodiment.

Enabling Event Prediction as an On-Device Service for Mobile Interaction

Mobile devices, such as smart phones, offer a large (and growing) number of functions that can only be accessed via a limited interaction bandwidth. Predictive (or adaptive) user interfaces (UIs) for mobile devices can dynamically optimize the interaction flow or UI layout for specific actions that a user is likely to perform.

Predictive UIs can reduce the amount of user effort needed for carrying out a task by offering the user a prediction or suggestion related to the task. One simple example of predictive UIs is a recency list used by a phone dialer. Use of a recency list is based on an assumption that a recently performed task, such as dialing a phone number, is likely to be performed again. Then, by presenting a recent item at a top position in a list, the recency list potentially reduces the user effort for searching for a phone number to dial.

Herein are described techniques and prediction module support to enable event prediction for an application. Other methods may be related to predicting specific types of behavior in their domain, e.g., application invocations in a Launcher (often the Home screen on a mobile device). To predict interaction events for an arbitrary application, a prediction technique can be customizable and dynamically adaptable for unexpected behaviors.

The herein-described prediction module enables ready incorporation of event prediction into their mobile applications. Such a prediction module frees application developers from repetitive effort of creating their own prediction techniques; e.g., on a per-application basis. The prediction module can save scarce mobile computing resources by sharing the same data management and prediction components across applications. In addition, the herein-described prediction module, acting as a central service, enables an untapped opportunity for making more accurate prediction by seeing events across applications.

The prediction module can include both a general method for event prediction that combines multiple prediction mechanisms via a well-defined online learning framework and a service to applications for providing event prediction, including a concise set of APIs for application/prediction module communication. The multiple prediction mechanisms rely on a number of features of event data from a device; e.g., event recency, previous events from the same application, previous events from other applications operating on the device, temporal and spatial regularity, and frequency patterns of events.

The herein-described prediction module provides a service for event prediction to software applications; e.g., applications for mobile devices. An application can send interaction events to the prediction module via a simple API. These interaction events can be arbitrary and only meaningful to the application, e.g., they can be application names for a launcher, phone numbers dialed for a dialer or search queries entered in a search box. Then, the application can then query how likely each of the interaction events would occur at a given time. An application can then optimize a user interface based on the predicted results, e.g., sorting a list of options based on their prediction scores.

The herein-described prediction module can serve arbitrary applications and so can be trained online; that is, without reference to prior training data. The prediction module can employ an online learning approach to combine multiple event prediction mechanisms that have each been proven useful for predicting certain behaviors. The prediction module can continuously refine a prediction model for each application as events from the corresponding application are received.

The herein-described prediction module can also learn how the events from one application relate to events from other applications; i.e., interaction behaviors in one application might be situated in a larger context. Utilizing events across applications can effectively address the sparsity of events for each single application. In some embodiments, the prediction module can be initially provided with prior data related to the application. The prior data can be based on a model of one or more general users, prior event captures, and/or prior user interaction with other, similar devices (e.g., interaction with an older mobile device that has been or is being replaced).

The herein-described prediction module provides event prediction as a general service to applications, particularly applications on mobile devices. Any application can easily invoke the prediction module via a set of simple APIs. The prediction module can learn from events for a variety of application behaviors as they occur and predict events with reasonable accuracy at a negligible time cost, even when the semantics and underlying distribution of target events are unknown. Thus, the herein-described prediction module can provide reliable predictions with little or no prior training based on a number of features in the event data. Further, the prediction module, as an enabler, provides support for application developers to build predictive user interfaces.

Example Data Network

FIG. 1 shows server devices 108, 110 configured to communicate, via network 106, with programmable devices 104a, 104b, and 104c. Network 106 may correspond to a LAN, a wide area network (WAN), a corporate intranet, the public Internet, or any other type of network configured to provide a communications path between networked computing devices. The network 106 may also correspond to a combination of one or more LANs, WANs, corporate intranets, and/or the public Internet.

Although FIG. 1 only shows three programmable devices, distributed application architectures may serve tens, hundreds, or thousands of programmable devices. Moreover, programmable devices 104a, 104b, and 104c (or any additional programmable devices) may be any sort of computing device, such as an ordinary laptop computer, desktop computer, network terminal, wireless communication device (e.g., a cell phone or smart phone), and so on. In some embodiments, programmable devices 104a, 104b, and 104c may be dedicated to the design and use of software applications. In other embodiments, programmable devices 104a, 104b, and 104c may be general purpose computers that are configured to perform a number of tasks and need not be dedicated to software development tools.

Server devices 108, 110 can be configured to perform one or more services, as requested by programmable devices 104a, 104b, and/or 104c. For example, server device 108 and/or 110 can provide content to programmable devices 104a-104c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 108 and/or 110 can provide programmable devices 104a-104c with access to software for database, search, computation, graphical, audio, video, World Wide Web/Internet utilization, and/or other functions. Many other examples of server devices are possible as well.

An Example Prediction Module

The design of event prediction methods can benefit from a solid understanding of mobile user behaviors. Developing interfaces that can reduce or eliminate the need for user input by predicting user actions can ease user effort and save user time while interacting with devices, such as smartphones. Recently, as mobile apps flourish, predicting application launches—which application the user is likely to invoke, has become more important in order.

The regularity of event transitions in mobile use, formally a Markov chain, can be useful in predicting application launches. First-order transition probabilities for Markov chains can be used in the prediction module. The prediction module also can employ two application-specific types of transition probabilities: one for event transitions within a target application and one for transitions across multiple applications.

The temporal pattern of event occurrences can be used for event prediction. Specific hours of a day or days of a week might be more likely for certain events to occur than other times, e.g., a user might always use a Flashlight application at night. One approach for utilizing temporal patterns is to derive a probabilistic distribution based on how often a target event occurs in a given time window. In some embodiments, the prediction module can use the hour of a day and the day of the week when an event occurs as features.

Spatial patterns of event occurrences also can be used for event prediction. Cell tower IDs only give a coarse estimate about the user's location, but has proven useful in event prediction. In contrast, GPS localization that gives much more precise location information of the user. However, more specific location information may not significantly improve prediction accuracy. In addition, the excessive battery consumption of GPS is prohibitive for mobile devices. In some embodiments, the prediction module can prediction module does not perform any active location sensing; rather, the prediction module relies on location data from events contributed by applications.

An inference model, e.g., a sequential decision process or a Naïve Bayesian model, can be used to combine individual prediction features (e.g., Markov-chain probabilities, recency-based probabilities, frequency, time of day, etc.). Typically, an inference model is either predetermined or has a dedicated training phase. In some embodiments, the prediction module can use online passive-aggressive algorithms to learn from events as they occur and to accommodate feature combination.

Figure 2:
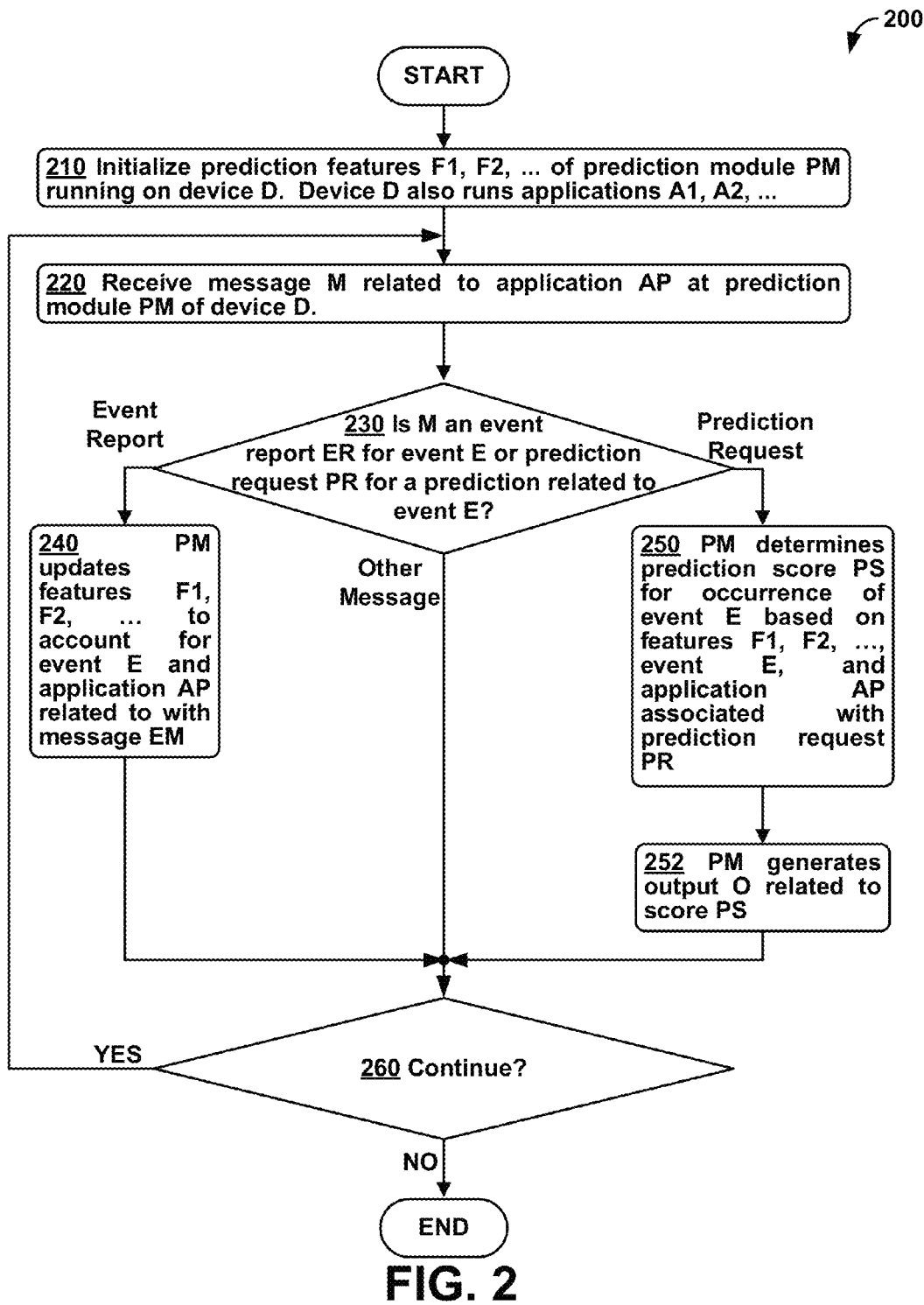
FIG. 2 is a flowchart of an example method for predicting events, in accordance with an embodiment.

FIG. 2 shows method 200 for predicting events using a prediction module, in accordance with an embodiment. Method 200 can begin at block 210, where features F1, F2 . . . of prediction module PM executing on device D can be initialized. Device D can also execute software for one or more applications A1, A2 . . . .

Each feature F1, F2 . . . can be a well-behaved primitive predictor. In some embodiments, each feature can generate a probability related to a probability of occurrence of one or more events. For example, a feature may provide a probability of an event occurring based on a most recent event that had previously occurred. In other examples, a feature can generate information related to a probability or prediction; e.g., a "Yes"/"No" prediction, a probability histogram, distribution, or other representation of one or more probabilities related to a group of events.

At block 220, prediction module PM running on device D can receive a message M. For example, message M can be an event message reporting receipt of a message, a prediction request or query requesting a prediction, or some other type of message. In other embodiments, message M can be some other type of indication than a message; e.g., a method or other function of prediction module PM can be invoked to provide the information described as being in message M.

At block 230, prediction module PM can determine if message M is (a) an event report ER to report occurrence of an event E, (b) a prediction request message PR to request a prediction related to event E, or (c) some other type of message. Message M can be related to application AP; e.g., application AP can be a sender of message M or otherwise related to message M.

If message M is an event report ER, method 200 can proceed to block 240. If message M is an event report ER, method 200 can proceed to block 260. If message M is some other type of message, that is, not an event report or prediction request, method 200 can proceed to block 260.

At block 240, prediction module PM can update features F1, F2 . . . to account for event E and application AP related to message M. After completing the procedures of block 240, method 200 can proceed to block 260.

At block 250, prediction module PM can determine prediction score PS to predict occurrence of event E for application AP based on features F1, F2, . . . , event E, and/or application AP associated with prediction request PR.

At block 252, prediction module PM can generate an output related to score PS. For example, prediction module PM can generate a message M2 or other indication of one or more scores related to prediction request PR, event EP, and/or application AP.

At block 260, prediction module PM and/or one or more other component(s) of device D can determine whether prediction module PM is to continue execution. If prediction module PM is to continue execution, then method 200 can proceed to block 220. Otherwise, method 200 can end.

Using the Prediction Module

Mobile developers can enable event prediction in their application using the prediction module. In some embodiments, the prediction module can be implemented as an Android service for devices, such as smartphones, mobile devices, and other computing devices. A service utilizing the prediction module (e.g., a process or thread) can run in the background and awake in response to an application request. Although programming details shown herein are specific to Java and Android, the design of the prediction module system can be generalized for use with other operating systems and/or programming languages.

As an example, suppose a developer D is developing a Phone Dialer application. To save the user effort of searching a desired contact, D wants the Phone Dialer to automatically recommend a list of contacts that a user is likely to call when the user opens the application. D can first register his application so to use the herein-described prediction module. Table 1 shows example Java code for registering an application to use the prediction module (called Reflection in the herein-provided code example).

TABLE 1

```
Reflection reflection = new Reflection(appContext);
reflection.register( ) = (new RegisterListener( ) {
    @Override
    public void onRegistered(int key) {
        dialerAppKey = key;
        // Save the key permanently for future
        // communication with Reflection
    }
});
```

In Table 1, appContext is an interface to global information about an application environment by which the prediction module can perform operations such as invoking a background service. In some embodiments, as the prediction module runs in a separate background process rather than in the application's own process, all API calls to the prediction module are asynchronous. Then, return results can be received through a callback listener.

Once registered, the Phone Dialer application can receive a randomly generated unique key identifying the application to the prediction module; e.g., dialerAppKey. Internally, the prediction module can create a prediction model for the application that can be uniquely identified by the key. The Phone Dialer application can store the key persistently for future communication with the prediction module, for both contributing events and querying for prediction. The key is private to the application such that other applications cannot access the application's event data.

Once registered, the Phone Dialer application can record events with the prediction module. For example, every time the user accesses a contact, such as "Ann", the Phone Dialer application can send an event message, e.g., a message with the name of the accessed contact, to the prediction module. Example software for sending the above-mentioned event message to the prediction module is shown below in Table 2.

TABLE 2

```
reflection.send(dialerAppKey, "Ann", new SendListener( ){
    @Override
    public void onEventAdded(int success) {
        if (success == 1) {
            // The event has been successfully added to Reflection
        }
    }
});
```

In some examples, an application records events with the prediction module that may be predicted in the future; e.g., if an application utilizes two types of events, E1 and E2, and the application only utilizes predictions of E1 type events, then E1 type events may be sent to the prediction module and E2 type events may not be sent to the prediction module.

Upon receiving an event message, the prediction module can update a prediction model referred to by the key in the event message; that is, the prediction module updates the prediction model for the Phone Dialer application as the "dialerAppKey" is passed into the reflection.send( ) method call. In some embodiments, D can add additional semantics to the event message using a hierarchical name scheme. For example, suppose D wants to maintain a hierarchy involving "type of operation", which can include originating calls, receiving calls, and contact look ups. Then, for contacts, the hierarchy can include "type of contact" and "contact" names. Then, in the relection.send( ) call, D prefixing "Ann" with "family" delimited by "/" to indicate Ann belongs to the contact group of family members; e.g., reflection.send(dialerAppKey, "contact/family/Ann"). Other events in this hierarchy can include other family members; e.g., reflection.send(dialerAppKey, "contact/family/Mom") and/or other types of contacts; e.g., reflection.send(dialerAppKey, "contact/work/George"), reflection.send(dialerAppKey, "contact/work/Maurice"), and other operations; e.g., reflection.send(dialerAppKey, "originate_call/work/George") to record the event of making a call to George at work.

The prediction module can extract multiple sub-events from an event that has hierarchies for updating prediction models. For example, the event "contact/family/Ann" can generate three sub-events: "contact/family/Ann", "family/Ann", and "contact/family". The event hierarchy allows the prediction module to capture more commonality across events, e.g., "contact/family/Carl" will also generate the "contact/family" sub-event.

As another example, suppose that a Phone Dialer user looks up a family member named Ann, calls Ann but Ann does not answer, and so the user calls "Mom" without looking up Mom's contact information. Then, just after calling Mom, the user receives a call from a number "5551212" which turns out to be "Boss" at work, discusses work with Boss, and then hangs up the phone. The Phone Dialer application can make calls to the prediction module as shown in Table 3 to send event messages for this example.

TABLE 3

```
reflection.send(dialerAppKey, "contact / family / Ann")
reflection.send(dialerAppKey, "originate_ call / Ann")
reflection.send(dialerAppKey, "hang up / Ann")
reflection.send(dialerAppKey, "originate_call / Mom")
reflection.send(dialerAppKey, "hang up / Mom")
reflection.send(dialerAppKey, "receive_call /5551212" )
reflection.send(dialerAppKey, "contact / work / Boss" )
reflection.send(dialerAppKey, "hang up / Boss")
```

Many other examples are possible as well.

As another example, D may want the Phone Dialer application to show a list of contacts when the user opens the application. To generate the list of contacts, the Phone Dialer application can query the prediction module for contacts that the user is likely to access. The prediction module can computes a score for each unique event that has been committed by the application, and can return a list of contacts sorted based on their scores. In some embodiments, the list of contacts can be provided using an asynchronous callback listener. In other embodiments, scores can be used by user interfaces. For example, fonts, type sizes, background color(s) and/or foreground color(s) for displayed contacts can be based on a score for the contact; e.g., a type size for a contact can be proportional to the score for the contact. Table 4 below shows example code for querying the prediction module for predicted events.

TABLE 4

```
reflection.query(dialerAppKey, new QueryListener( ){
    @Override
    public void onQueryProcessed(List<Prediction> items) {
        // Populate recent call list with prediction results
        for (Prediction prediction : items) {
            String contactName = prediction.event;
            float score = prediction.score;
            addItem(contactName, score);
        }
    }
});
```

The prediction module can accept a filter in a query for predicted events. Using the dialer example of FIG. 3 above, Table 5 shows some example filtered queries and results

TABLE 5

| Filtered Prediction Module Query | Query Results |
| --- | --- |
| reflection.query(dialerAppKey, "family", QueryListener); | Return predicted events related to "family" |
| reflection.query(dialerAppKey, "family / Ann", QueryListener); | Return predicted events related to "Ann" associated with "family" |
| reflection.query(dialerAppKey, "work / Ann", QueryListener); | Return predicted events related to "Ann" associated with "work" |
| reflection.query(dialerAppKey, "receive_call", QueryListener); | Return predicted events related to "receive_call" events |

As another example, another developer K is developing a mobile Ordering application for ordering pizza for a restaurant. To better personalize customers' ordering experience, K can program the Ordering application to have the prediction module help optimize dish recommendations. To do so, whenever the user makes an order, the Ordering application can send the order name as an event to the prediction module; e.g., reflection.send(orderAppKey, "seafood deluxe").

The Ordering application can query the prediction module for the dishes that the user might want to order at a given time. To provide predictions on pizza orders for the Ordering application, or for other predictions, the prediction module can capture event patterns both within the same application (e.g., an Ordering user might often order "seafood deluxe" with "buffalo wings") and across different applications (e.g., ordering "seafood deluxe" might occur just before or just after the Phone Dialer application indicates a call "Ann") Leveraging cross-application patterns is possible because the same prediction module receives events from various applications using the device. Each application developer does not have to be aware of interaction behaviors in other applications. Any complexity in capturing event patterns is transparent to developers and they only need to communicate with the prediction module via the above-mentioned APIs.

Example Event Prediction Features of the Prediction Module

The prediction module can create a prediction model for each registered application. The prediction module can predict events by combining a set of features, or well-behaved primitive predictors, using an online learning method. These features can include, but are not limited to, one or more of: a probabilistic recency feature, an event frequency feature, a Markov chain feature, a cross-application Markov chain feature, a time feature, a location feature, and a Poisson feature.

The Probabilistic Recency (Briefly, Recency) Feature.

As mentioned earlier, the recency of an event is a simple but effective indicator for whether the event is going to reoccur. Recency ranking can be readily updated for each event by moving a newly occurred event to a top position of a ranking list. Recency has been widely used in the research literature and commercial products; e.g., in the contexts of a recent call list or recently opened files.

However, a recency ranking—the position of an item in the ranking list—does not indicate how likely an event would occur. Determining a numerical value of recency proportional to how likely an event would occur can be useful in using recency as a feature for the prediction module. Equation (1) below can output the probability of an event, $e_i$, given a recency ranking $r_i$, $$P(e_i/r_i) = \alpha r_i^{-\beta} \quad (1)$$

In Equation (1) and throughout, the term $e_i$ denotes the ith event of all unique events in the target application. Also, in Equation (1), $\alpha$ and $\beta$ are coefficients. In some embodiments, $\alpha$ and $\beta$ can be are acquired by fitting a power function over the distribution of recency rankings of a pilot dataset. A power function may be used to provide a better fit with the recency distribution in comparison with other functions; e.g., exponential functions.

The Event Frequency (Briefly, Frequency) Feature.

Another simple measure that has been widely used is the frequency of visited items, i.e., more frequently used items are more likely to be revisited. Because frequency counts can be widespread, a probability function for recency rankings can be difficult to derive. Instead, given the frequency count, $f_i$, of an event, $e_i$, and an arbitrarily small value $\epsilon$, a score can be acquired for $f_i>0$, based on Equation (2):

$$P(e_i | f_i) \approx 1 - \frac{1}{f_i} + \epsilon \quad (2)$$

Equation (2) generates values in a range of 0 to 1 that is comparable with the value range of other features. This property is important for us to weigh these individual features appropriately for yielding the final prediction.

The Conjunct Markov Chain (Briefly, Markov) Feature.

An occurrence of a last event $e_l$ can signal how likely a next event $e_i$, is about to occur. Formally, this feature measures the transition probability $P(e_i|e_l)$ between two adjacent events in the sequence using a first-order Markov chain. The transition probability distribution can be updated as each event arrives, as indicated by Equation (3):

$$P(e_i | e_l) = \frac{|e_l e_i| + dP(e_i)}{|e_l| + d} \quad (3)$$

For Equation (3), $|e_l e_i|$ is the number of occurrences of the transition from $e_l$ to $e_i$, and $|e_l|$ is the number of observations of $e_l$, $P(e_i)$ is a prior probability of $e_i$, and d is an estimate of the total number of unique events that has been observed. Equation (3) utilizes Laplace smoothing to give unobserved transitions a non-zero probability.

A first-order Markov chain only relies on the last event, which can be unreliable. However, looking at a longer event sequence in the past—a higher order Markov chain—can require significantly more observations to train and can be sensitive to noise. Instead, first-order Markov chains from multiple events in the time window T before the last event can be considered. Equation (4) can combines multiple Markov probabilities by taking the average of their log probabilities.

$$P(e_i | E_l^T) = \left( \prod_{e_r \in E_l^T} P(e_i | e_r) \right)^{1/|E_l^T|} \quad (4)$$

For Equation (4), $E_l^T$ denotes the set of unique events in the time window. In some embodiments, T can be set to 0 to only consider the most recent concurring events, e.g., multiple sub-events from an event hierarchy.

The Cross-Application Conjunct Markov Chain (Briefly, Cross-Markov) Feature.

In addition to event transitions within a target application, the prediction module can consider how the last event from one or more other applications predicts the event occurrence in the target application. The prediction module can capture first-order Markov chains of events that occur across different applications and use the resulting Cross-Markov feature for event prediction. The Cross-Markov feature is based on the intuition that an event occurrence might be situated in a larger context than only one application. Leveraging events from other applications allows the prediction module to capture more event correlations that can potentially boost the prediction accuracy of each application.

The calculation of this feature for a target application can be performed using equation similar to Equations (3) and (4) except that $E_i^T$ is the last occurred event in one or more non-target applications. In some embodiments, a larger time window T can be used for past events from non-target applications; e.g., T=60 seconds, to be more robust to noise from the non-target applications.

This feature can be calculated for each other application than the target application; e.g., if the prediction module is receiving predictions for N applications, A1, A2 . . . AN, with A1 being the target application (without loss of generality), then N−1 Cross-Markov probabilities can be calculated: a probability for event occurrence for application A1 given the last event occurrence for application A2, a probability for event occurrence for application A1 given the last event occurrence for application A3, . . . and a probability for event occurrence for application A1 given the last event occurrence for application AN. The above-mentioned N−1 Cross-Markov probabilities can be calculated periodically; e.g., every 5 or 10 seconds and/or when a predetermined number of events (e.g., 1 event, 5 events, 10 events) is/are received from the applications A1, A2, . . . AN.

Other examples have concentrated on event transitions within a single application behavior, e.g., application launches, without leveraging event transitions outside of the target application. By factorizing Markov chains as two separate features—a within-application Markov feature and a cross-application Markov feature, the state space of transition probabilities has been effectively reduced and the sparsity of events has been addressed.

The Temporal & Spatial Regularity/Hour, Day, Cell Tower, and Cell Geo Features.

Many mobile interaction behaviors have a strong spatiotemporal pattern, e.g., calling someone on weekends or checking emails only at work. Unlike signals such as motion acceleration or GPS locations, time can be acquired for free. In particular, a probability for an event to occur in a specific hour of the day $P(e_i|h_j)$, or on a specific day of the week $P(e_i|d_j)$ can be used. For locations associated with mobile devices, a cell tower ID and its Geo code can provide a coarse measure of the user's location. Further, the cell tower ID can be easily acquired by many mobile devices. In some embodiments, Laplace smoothing can be used to give unobserved hours, days or cell tower IDs a non-zero probability. In other embodiments, a time feature can include the hours, the days, or the hours and days. In still other embodiments, a location feature can include a cell tower ID, a location based on the cell tower ID, and/or another location (e.g., a location of a device determined via GPS or another technique).

The Poisson Feature.

The Poisson feature is related to a frequency pattern of events—how often an event is supposed to occur in a given time interval based on an expected occurrence frequency. For example, Ben calls Angela about twice a week and these calls can occur on any day of the week. This calling pattern and other frequency patterns can be modeled as a Poisson distribution. The Poisson feature can use Equation (5) to output a probability of a given number of events to occur in a predefined time interval (e.g., a day), such as expressed in Equation (5):

$$P(e_i \mid c_i \lambda_i) = \frac{\lambda_i^{(c_i+1)} e^{-\lambda_i}}{(c_i+1)!} \qquad (5)$$

Given that an event $e_i$ has occurred in the predefined time interval $c_i$ times at an expected rate of occurrence for predefined time interval $\lambda_i$, Equation (5) can compute the probability $P(e_i|c_i\lambda_i)$ for the event $e_i$ to occur again within the predefined time interval. In some embodiments, $\lambda_i$ can be incrementally calculated each time interval.

In some embodiments, more situational factors can be added, such as GPS locations or motion signals. However, this additional information may not contribute to overall prediction accuracy, because these dimensions are often correlated with event time, which can be equated with event message arrival or, in some embodiments, be specified in an event message. In addition, extra signals can incur significant battery consumption and computational cost that are undesirable for a mobile prediction module.

Combining Features to Predict Event Occurrences

Each of the above-mentioned features can predict occurrence of an event based on a specific aspect of event patterns. Occurrence an event could depend more on some of the features but less on the rest. For example, a user might use Music Player more often at certain hours of the day (Hour), e.g., when she commutes, but visits a stock portfolio website only when her investment advisor calls (Cross-Markov). The occurrence of an event often depends on multiple features.

One approach to generate a prediction score based on multiple features is to linearly combine the features based on a set of weighting factors, or weights. Formally, let $\phi_j$ refer to the jth feature mentioned above for $1 \le j \le 9$. The jth feature can be scored for each event $e_i$ at time t and denoted as $\phi_j(t, i)$. By concatenating the score from each feature, a feature vector $\Phi(t, i)$ can be acquired for event $e_i$ at time t; that is, $\Phi(t, i) = (\phi_1(t, i), \ldots, \phi_9(t, i))$. Each event can be scored based on the dot product of weight vector, $w_i$, and feature vector $\Phi(t, i)$, as indicated by Equation (6):

$$\text{Score}(e_i, t) = w_i \cdot \Phi(t, i) \qquad (6)$$

Using Equation (6), events with a higher Score($e_i$, t) value are more likely to occur than those with a lower Score($e_i$, t) value. $w_i$ can be specified for each event (as denoted by its subscript) to allow dependency on features to differ from event to event.

An online learning task can be a task that a prediction engine needs to continuously update itself as event instances are observed in a sequential manner. One online learning algorithm is Perceptron, which updates weights only when a prediction is inconsistent with an observation. Other online learning algorithms include Passive Aggressive algorithms, a class of online learning algorithms that enhances Perceptron by applying additional constraints when updating the weights. These additional constraints can: 1) minimize the change to the weights so as to be conservative when seeing a single observation, and 2) enforce a minimum margin between the score of the target event and score(s) of other events.

Upon receiving each event, the received event can be used as the target event (i.e., a labeled example). The prediction module can determine how consistent a prediction of the received event's occurrence is consistent with the actual occurrence of the received event. If the prediction score for the received event is below a minimum margin value, the one or more other events can be classified as "violated" since the received event violated a constraint associated with the minimum margin value. Then, weights for the weight vector of the received event can be increased and weights for violated, events can be decreased. Let r denote the index of the target event and let s be the index of a violated non-target event with r≠s. Equation (7) can be used to decrease weights of the violated event $e_s$:

$$w_s^{t+1} = w_s^t - \tau^t \Phi(t,s) \qquad (7)$$

where $$\tau^t = \frac{1 - \text{Score}(e_r, t) + \text{Score}(e_s, t)}{\|\Phi(t, r)\|^2 + \|\Phi(t, s)\|^2};$$

i.e., the margin between the violated event and the received (and target) event divided by the sum of their L2 Norm squares.

Equation (8) can be used to increase the weights of the target event $e_r$ for the same rate:

$$w_r^{t+1} = w_r^t - \tau^t \Phi(t,r) \qquad (8)$$

Overall, the prediction score for each event can be generated independently according to Equation (6). But, the prediction module can calibrate the weights of different events during learning by ensuring a target event's score is sufficiently larger than a non-target event's score. The prediction module continuously retrains these individual features and refines the weight for each event as each event is observed.

Evaluation of an Example Implementation of the Prediction Module

In some embodiments, the prediction module can include software written in Java, using Android SDK. In particular embodiments, a prediction engine of the prediction module does not use any platform-specific API calls (e.g., Android-specific API calls) and is platform independent.

The prediction module can include two components: the service and the client library. In some embodiments, the service is implemented as an Android Service running in a separate process in the background. The service can host the prediction engine by receiving prediction requests from applications, passing prediction requests to the prediction engine, and sending responses (results) from the prediction engine back to applications. The service can exit after processing all pending requests. The client library can run as part of an application process and can implement at least the API calls described above related to registering an application, sending event messages, and making prediction requests. The client library can encapsulate the details for communicating with the service. In some embodiments, communication between the client library and the service can be based on Android's Service Binding and Messenger Handler mechanisms, and all computation can take place locally on a mobile (or other computing) device.

The prediction module can predict events of interest and adapt to addressing different types of interaction behaviors. To test the prediction module, three popular mobile applications were chosen as clients of the prediction module: a Launcher application, a Dialer application, and a Browser application, where the Launcher application starts (or launches) applications (e.g., the Home Screen of a smartphone), the Dialer application can be used for telephone communications, and the Browser application can be used for Internet/Web communications.

An example smartphone "Device A" included an event logger for smartphone usage and collected data from over four thousand users to generate a herein-named Device A dataset, also including Dialer, Browser, and Launcher application usage. Another example smartphone "Device B" had logging infrastructure for measuring smartphone usage longitudinally, including Dialer, Browser, and Launcher application usage. In particular, Device B was deployed with logging to 25 users for one year that generated a dataset named "Device B" herein.

The prediction module was evaluated with two large-scale sets of in situ event logs: one was collected using Device A devices and the other was collected from Device B devices. For the Device A dataset, a logger ran quietly in the background of over 100 Device A participants and captured interaction events such as applications being launched, phone call events, and web URLs, including search queries, being issued and device status information; e.g., docking status. All privacy-sensitive information such as phone numbers and web queries were stored locally on a user's device and only index IDs were collected, e.g., in the Device A dataset, two phone calls are made to the same number can be identified but the specific number cannot be recovered.

To simulate the target input of the prediction module, namely a series of events contributed by applications, the Device A and Device B datasets were filtered to only include events of the three applications mentioned. For example, a Launcher event is registered only if application usage immediately follows the invocation of Launcher in a collected log trace, where the log trace is chronologically organized. In contrast, if application usage is recorded when a user clicks on the Back button, such usage is not considered as a Launcher event.

Users who only used their devices occasionally during data collection were excluded. In particular, only users with log traces longer than one month were selected. In each data set, each of the three applications had to have at least 20 unique events that occurred during the course of data collection for each user, to ensure a lower bound of event prediction complexity; i.e., typically, prediction difficulty increases with the number of unique events.

Based on these selection criteria, log traces of 57 Device A volunteers were used to form the Device A dataset. These log traces involved 141,196 events generated over one to three months (Median=39 days, Min=33, Max=106). The same filtering process was applied to the Device B dataset, which resulted in 478,029 events from 23 Device B users generated roughly over one year (Median=367 days, Min=279, Max=480).

Figure 3:
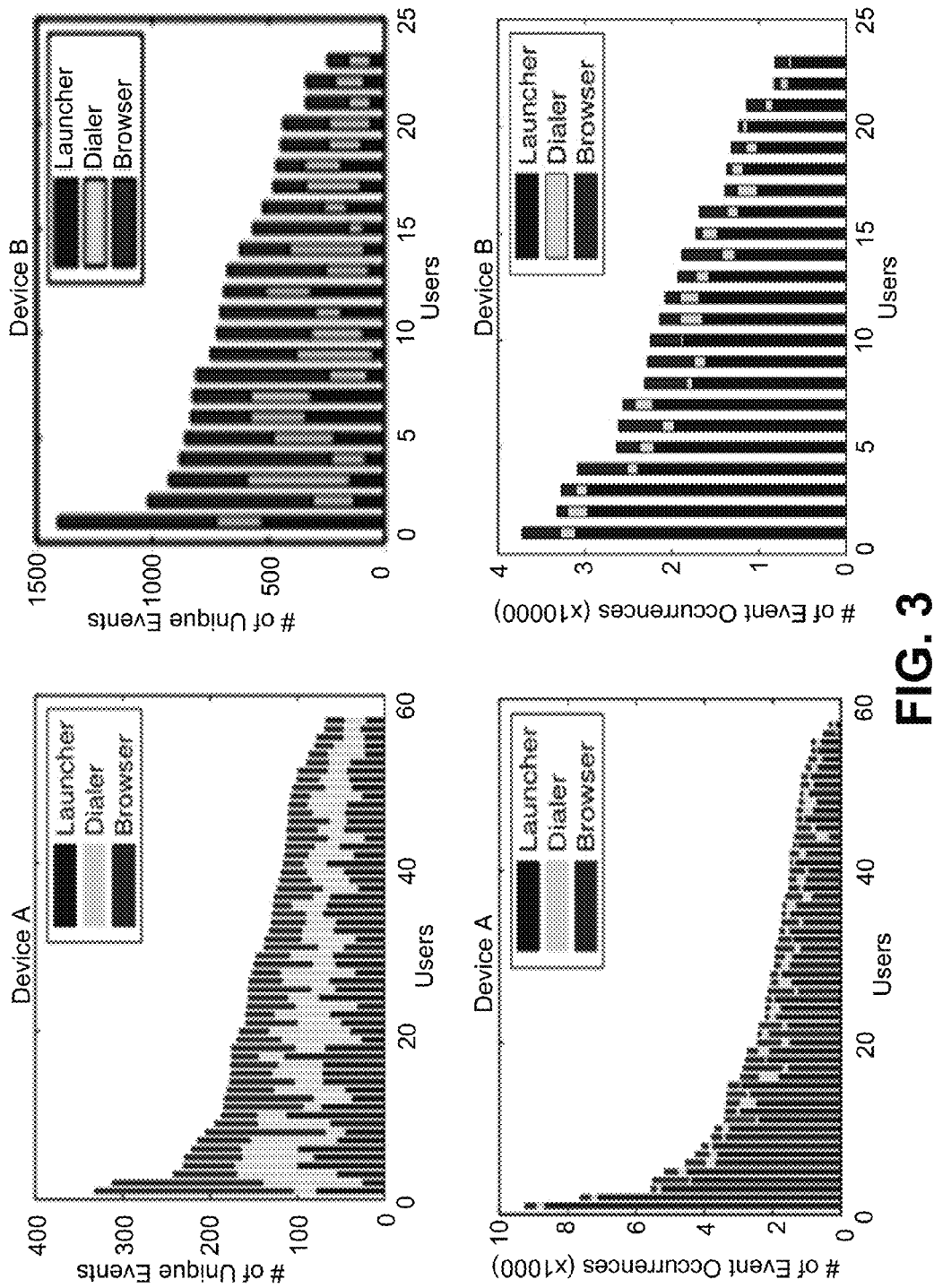
FIG. 3 shows graphs of event count and event occurrence data related to events from two sets of mobile devices, in accordance with an embodiment.

To understand the complexity of the datasets, the number of unique events that users invoked in each of these applications was analyzed, as shown in the top row of FIG. 3, with the upper-left corner including a graph of data for the Device A dataset, and the upper-right corner including a graph of data for the Device B dataset.

A large amount of variation in the number of unique events per user and per application can be observed. For the Device A dataset, a number of unique behaviors invoked by Launcher obeys an exponential distribution (Median=47, Min=22, Max=116). Both the number of unique phone calls and the number of unique URLs for each user seem to obey a power law distribution (Dialer: Median=40, Min=20, Max=115, and Browser: Median=40, Min=20, Max=227).

For the Device B dataset, the median numbers of unique events invoked for application launching, phone calling and web browsing are 96 (Min=46, Max=527), 189 (Min=73, Max=452) and 257 (Min=83, Max=708), respectively. It is understandable that the Device B dataset has significantly more unique events per user because Device B data was collected over a longer time period than Device A data.

In addition to the number of unique targets that an event predictor has to choose from, the prediction complexity is also affected by how often an event occurs. Intuitively, the more an event occurs, the better chance a predictor can learn from it. The number of occurrences of an event in each target application for each user can obey a power law distribution, with a few events occurring very often and the rest occurring rarely as shown in the Device A and Device B graphs on the bottom row of FIG. 3.

For the Device A dataset, as graphed on the lower-left portion of FIG. 3, the mean length of each user's log trace—the number of events in the trace—is 2,477 events (SD=1, 676). In particular, Launcher events accounted for the dominant portion of a trace (MEAN=75%, SD=15%), which is followed by Browser events (MEAN=15%, SD=12%) and Dialer events (MEAN=10%, SD=7%). For the Device B dataset, as graphed on the lower-right portion of FIG. 3, the mean length of each user's log trace is 20,688 events (SD=8, 061), and similar to the Device A dataset, Launcher events accounted for the dominant portion of a trace (MEAN=80%, SD=7%), followed by Browser events (MEAN=12%, SD=7%) and Dialer events (MEAN=8%, SD=3%).

The performance of each of the nine features as a standalone predictor (referred to as a component predictor) and their combination (referred to as the prediction module) was evaluated using data from the two data sets. The prediction module was also compared with a Naïve Bayesian predictor.

Each prediction technique—component predictors, prediction module, and Naïve Bayesian predictor—was provided with an event stream; e.g., a log trace in a dataset in an online, or event by event, fashion. Each technique was requested to predict occurrence of an event after the event had been observed at least once, using the timestamp of the event as the query time. For the Device B dataset with collected Cell information, the Cell Tower and Cell Geo information was provided at query time. The ranking of the target event was recorded to calculate how often the target event was ranked as the top choice. The prediction technique was then permitted to learn from the event. This process was repeated for each event in the event stream.

Figure 4:
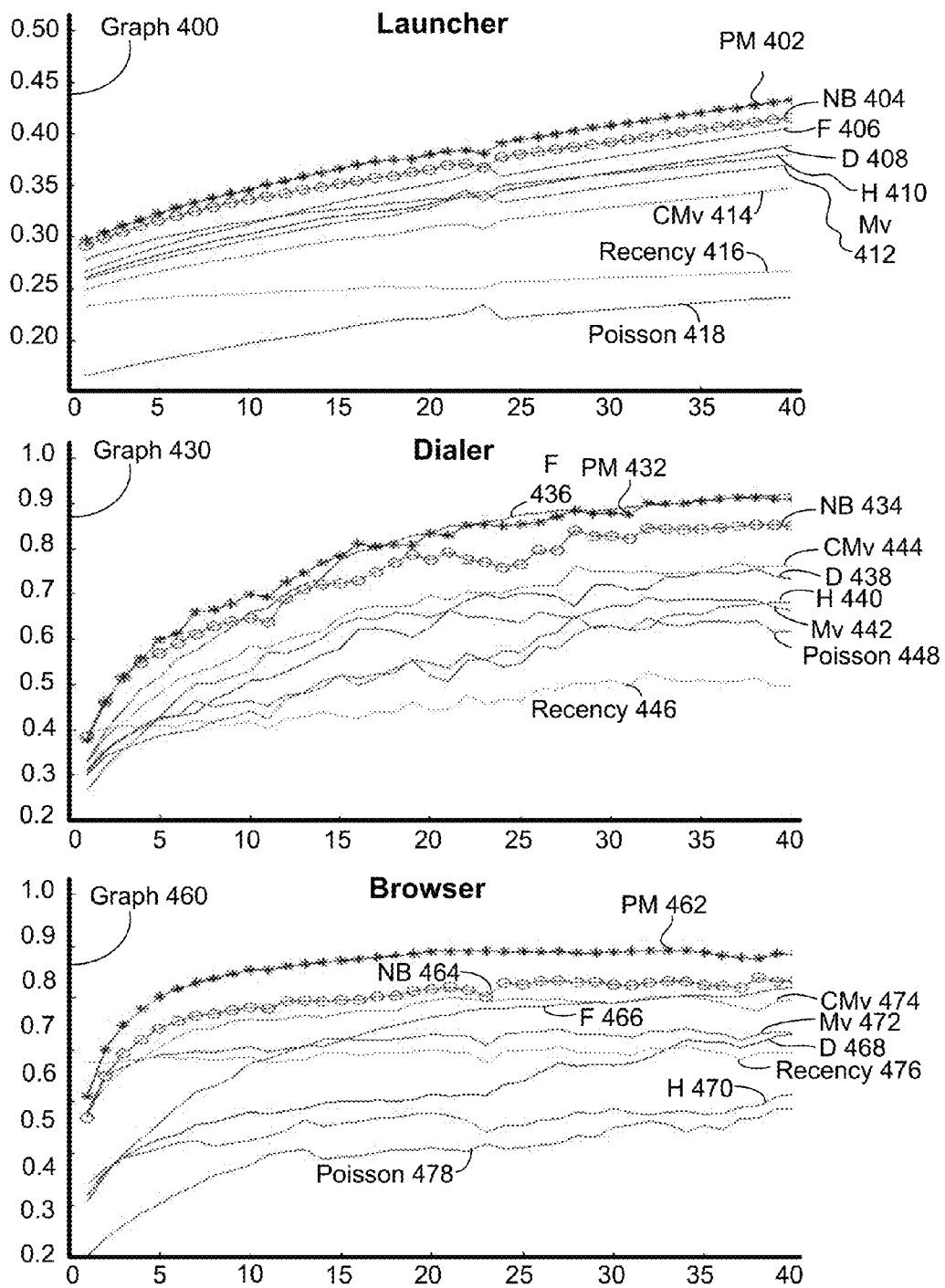
FIG. 4 shows graphs of predictor accuracy versus a number of occurrences in a Device A dataset, in accordance with an embodiment.
Figure 5:
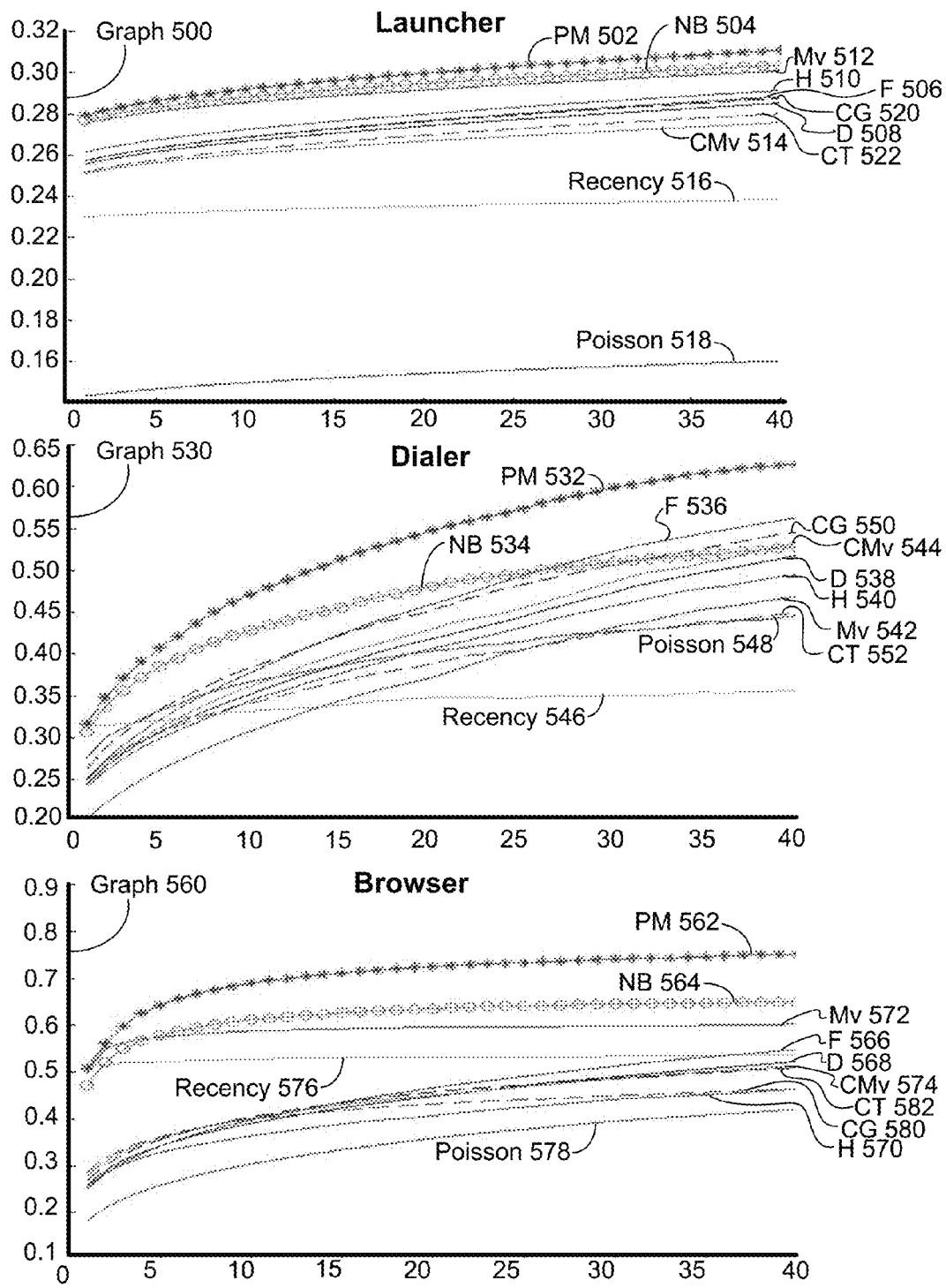
FIG. 5 shows graphs of predictor accuracy versus a number of occurrences in a Device B dataset in accordance with an embodiment.

As expected, the accuracy of each prediction method generally increases as more event occurrences are observed as shown in FIGS. 4 and 5. FIG. 4 shows graphs of accuracy for each predictor versus a number of occurrences in a Device A dataset, in accordance with an embodiment.

FIG. 4 includes three graphs 400, 430, 460, where each graph shows a number of event occurrences on the X (horizontal) axis and accuracy in terms of the best guess on the Y (vertical) axis, with accuracy ranging from 0; e.g., completely inaccurate to 1 e.g., completely accurate. Graph 400 at the top of FIG. 4 shows prediction accuracies for the Launcher application on Device A with respect to the prediction module (PM) predictor 402, Naïve Bayesian (NB) predictor 404, frequency (F) feature 406, day (D) feature 408, hour (H) feature 410, Markov (Mv) feature 412, Cross-Markov (CMv) feature 414, recency feature 416, and Poisson feature 418. In graphs 400, 430, 460 shown in FIG. 4, prediction module predictor data are shown using a line with *'s (asterisks) added and Naïve Bayesian predictor data are shown with is shown using a line with circles added.

Overall, prediction module predictor 402, which uses a weighted sum of all other feature predictions, performed the best for the Launcher application. Then, a Naïve Bayesian predictor 404 and frequency feature 406 had a similar, if lesser, performance to that of prediction module predictor 402. Recency feature 416 and Poisson feature 416 were the least successful predictors for the Launcher application on Device A.

Graph 430 in the middle of FIG. 4 shows prediction accuracies for the Dialer application on Device A with respect to prediction module predictor 432, Naïve Bayesian predictor 434, frequency feature 436, day feature 438, hour feature 440, Markov feature 442, Cross-Markov feature 444, recency feature 446, and Poisson feature 448. Overall, prediction module predictor 432 performed the best for the Dialer application with frequency feature 436 showing similar performance. Recency feature 446 and Poisson feature 448 were the least successful predictors for the Dialer application on Device A.

Graph 460 at the bottom of FIG. 4 shows prediction accuracies for the Browser application with respect to the prediction module predictor 462, Naïve Bayesian predictor 464, frequency feature 466, day feature 468, hour feature 470, Markov feature 472, Cross-Markov feature 474, recency feature 476, and Poisson feature 478. Overall, prediction module predictor 462 performed the best for the Browser application. Regarding single features, frequency feature 466 and Cross-Markov feature 474 performed the best in this example and were virtually tied in performance. Hour feature 470 and Poisson feature 478 were the least successful predictors for the Browser application on Device A.

FIG. 5 shows three graphs 500, 530, 560 of predictor accuracy versus a number of occurrences in a Device B dataset in accordance with an embodiment. Each graph 500, 530, 560 in FIG. 5 shows a number of event occurrences on the X axis and accuracy in terms of the best guess on the Y axis, with accuracy ranging from 0; e.g., completely inaccurate to 1 e.g., completely accurate. Graph 500 at the top of FIG. 5 shows prediction accuracies for the Launcher application on the Device B with respect to the prediction module predictor 502, Naïve Bayesian (NB) predictor 504, frequency feature 506, day feature 508, hour feature 510, Markov feature 512, Cross-Markov feature 514, recency feature 516, Poisson feature 518, and location features 520, 522. Location features are specified in the Device B data using Cell Geo (CG) 520, 550, 580 and Cell Tower (CT) 522, 552, 582 values. In graphs 500, 530, 560 shown in FIG. 5, prediction module predictor data are shown using a line with *'s added, Naïve Bayesian predictor data are shown with is shown using a line with circles added, and Cell Geo and Cell Tower data are each shown using dashed lines.

Overall, prediction module predictor 502, which is a weighted sum of all other feature predictions, performed the best for the Launcher application with Naïve Bayesian predictor 504, Markov feature 512, hour feature 510, location feature 520, frequency feature 516, Cell Geo feature 520, day feature 508, Cell Tower feature 522, and Cross-Markov feature 512 all showing similar, if somewhat lesser, performance to prediction module predictor 502. Recency feature 516 and Poisson feature 518 were the least successful predictors for the Launcher application on Device B.

Graph 530 in the middle of FIG. 5 shows prediction accuracies for the Dialer application on the Device B with respect to prediction module predictor 532, Naïve Bayesian predictor 534, frequency feature 536, day feature 538, hour feature 540, Markov feature 542, Cross-Markov feature 544, recency feature 546, Poisson feature 548, Cell Geo feature 550, and Cell Tower feature 552. Overall, prediction module predictor 532 performed the best for the Dialer application with frequency feature 536 indicating similar performance to that of prediction module predictor 532. Cell Tower feature 552, Poisson feature 548, and recency feature 546 were the least successful predictors for the Dialer application on the Device B.

Graph 560 at the bottom of FIG. 5 shows prediction accuracies for the Browser application with respect to the prediction module predictor 562, Naïve Bayesian predictor 564, frequency feature 566, day feature 568, hour feature 570, Markov feature 572, Cross-Markov feature 574, recency feature 576, Poisson feature 578, Cell Geo feature 580, and Cell Tower feature 582. Overall, prediction module predictor 562 performed the best for the Browser application with Naïve Bayesian predictor 564 performing in a similar albeit lesser fashion. Regarding single-feature predictors, Markov feature 572 and recency feature 576 performed best initially, but frequency feature 566 caught up to recency feature 576 after approximately 35 event occurrences. Poisson feature 578, Hour feature 570, and Cell Tower feature 582 were the least successful predictors for the Browser application on Device B.

The prediction module predictors 402, 432, 462, 502, 532, 562 consistently outperformed component a Naïve Bayesian predictor and single-feature predictors across both datasets, indicating that a combination of single-feature predictors provides better accuracy than using any one of them alone. On average, after an application launch event has occurred 40 times, prediction module predictor 402 can predict an application launch with 44% accuracy compared to 41% accuracy by frequency feature 404 with $\chi^2=7.8$, $p<0.01$, the strongest component predictor for Launcher for the Device A dataset.

The prediction module predictors showed significant improvement over single-feature predictors in several situations. For example, prediction module predictor 562 exceeded strongest single-feature predictor for Browser behavior for Device A and Device B by 15% and 7% respectively. Additionally, prediction module predictor 532 for Device B Dialer application performance exceeded strongest component predictor performance by 7%.

The strongest single-feature predictor for each behavior tends to vary. For example, in the Device B dataset, on average, the Markov feature appears to be the most accurate single-feature predictor for Launcher. However, Cell Geo 550 was a strong single-feature predictor for the Device B Dialer.

Across all behaviors, the frequency feature seemed to perform better for the Device A dataset than the Device B dataset; e.g., as indicated by comparing frequency features 406, 436, 466 for the Device A dataset with corresponding frequency features 506, 536, 566 for the Device B data set. One explanation is that the data collection for the Device A dataset was performed over a relatively short duration so the accuracy of frequently occurred events dominates the overall performance. The Poisson feature performed poorly for Launcher and Browser behaviors, but the Poisson feature appears to be useful for the Dialer application, whose events occur more regularly in a given time interval, e.g., the number of calls to someone per day. The recency feature can perform well when there are few event occurrences—especially for the Dialer and Browser applications. However, as more events are observed, the rate of improvement of the recency feature is slower than other features and/or quickly plateaus.

Figure 6:
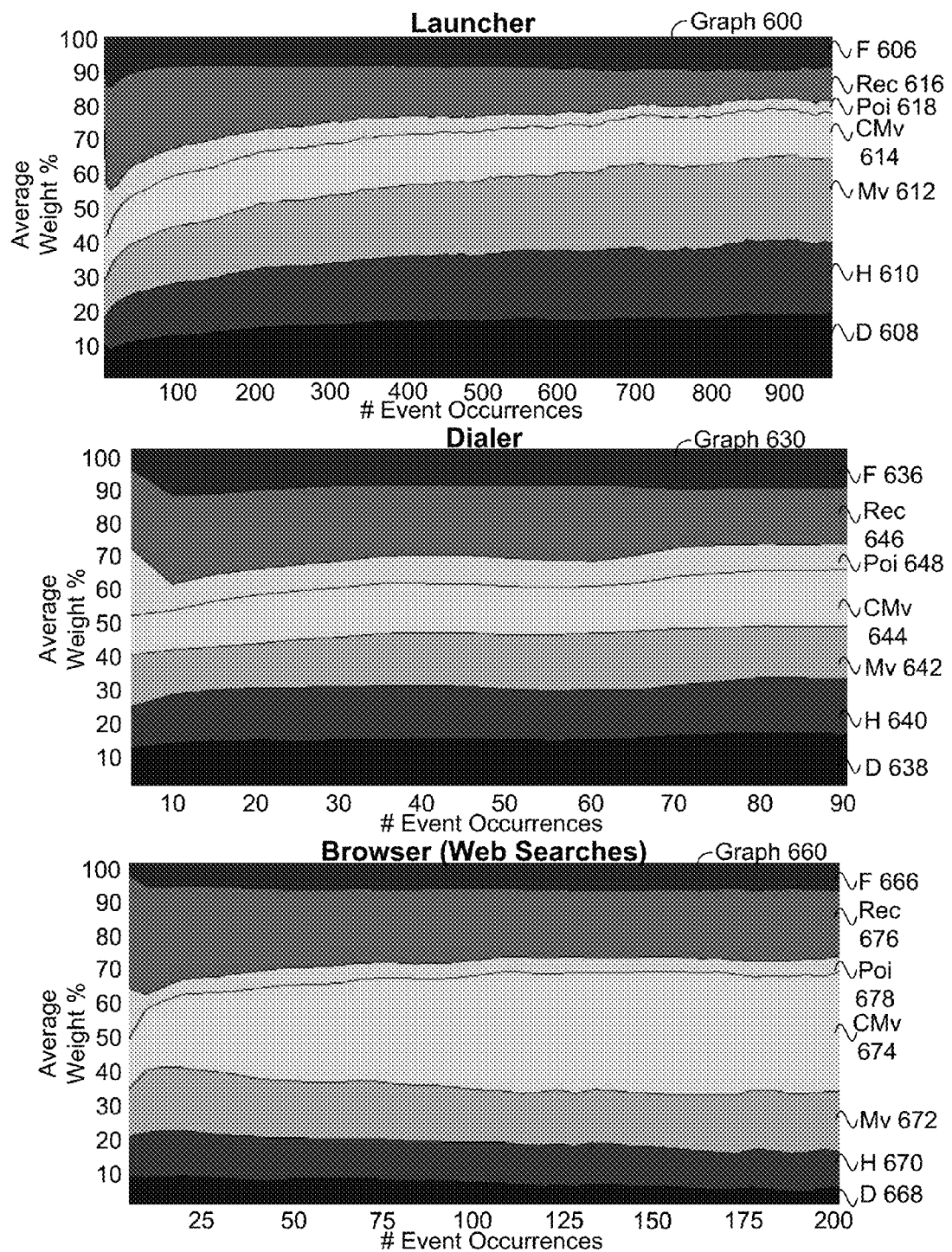
FIG. 6 shows graphs of feature weights for event prediction versus a number of event occurrences, in accordance with an embodiment.

One consideration was to learn how each single-feature component predictor contributes to the overall accuracy of the prediction module predictor and how single-feature component predictor weights evolve over time. To give an aggregated analysis of feature dependencies in each application, upon learning from each event occurrence, the weight vectors were averaged across all the events in the application FIG. 6 shows three graphs 600, 630, 660, each graph graphing a number of event occurrences for Device A on the X axis and an average weight percentage on the Y axis, in accordance with an embodiment. The average weight percentage for a particular feature characterizes a weight of the contribution of the particular feature to event prediction. Graphs 600, 630, and 660 of FIG. 6 show how average weight percentages change as respective Dialer, Launcher, and Browser events for Device A are observed. In each graph of FIG. 6, weights are normalized and then averaged across all the target events in each application.

In each graph 600, 630, 660, weight percentages for features are shown in the following order: from top to bottom, the frequency feature, the recency feature, the Poisson feature, the Cross-Markov feature, the Markov feature, the hour feature, and the day feature. At any particular time; e.g., when a specified number of events are observed, a relative width of the region used to represent a given feature indicates a relative weighting for the feature—the wider (narrower) a region for a designated feature in graph 600, 630, or 660, the stronger (weaker) the relative weighting for the designated feature.

Graph 600 shows weight percentages for features for the Launcher application based on the Device A dataset. FIG. 6 shows graph 600 with weight percentages for frequency feature 606, recency (Rec) feature 616, Poisson (Poi) feature 618, Cross-Markov feature 614, Markov feature 612, hour feature 610 and day feature 608. Graph 600 indicates that recency feature 614 has a relatively large width, and corresponding feature weight, when the number of Launcher event occurrences is small, but the relative weight of recency feature 616 diminishes as more events are seen. The opposite effect—relative weights increasing as more Launcher events occur—can be observed based on relative widths in graph 600 for Markov feature 612, hour feature 610, and, to a lesser extent, day feature 608.

Graph 630 shows weight percentages for features for the Dialer application based on the Device A dataset. FIG. 6 shows graph 630 with weight percentages for frequency feature 636, recency feature 646, Poisson feature 648, Cross-Markov feature 644, Markov feature 642, hour feature 640, and day feature 638. Relative widths for features in graph 630 indicate that a relative weight of recency feature 646 diminishes, and that a relative weight of Cross-Markov feature 644 increases somewhat as more Dialer events are seen.

Graph 660 shows weight percentages for features for the Browser application based on the Device A dataset. FIG. 6 shows graph 660 with weight percentages for frequency feature 666, recency feature 676, Poisson feature 678, Cross-Markov feature 674, Markov feature 672, hour feature 670, and day feature 668. The relative widths of recency feature 646 in graph 660 indicate that the relative weight of recency feature 646 diminishes initially as more Browser events are seen and then generally levels off. In contrast, the relative weight of Cross-Markov feature 674 increases steadily as more Browser events are seen, as indicated by the relative width of Cross-Markov feature 674 in graph 660.

Overall, the recency feature tends to be dominant initially but became less so as more event occurrences were observed, which is consistent as when used as a standalone predictor. Day and Hour features are more useful for predicting application launches as shown by graph 600 than for Browser URLs, as shown in graph 660.

The contribution of the frequency feature seems moderate across all three applications, which at a quick glance seems contradictory to the analysis discussed above in the context of FIGS. 4 and 5. This is because frequently occurring events tend to dominate overall accuracy in FIGS. 4 and 5, while FIG. 6 indicates how weights are allocated to each feature across events, using normalized weight vectors.

Markov and Cross-Markov are generally useful features across all the application behaviors. In particular, Cross-Markov grew into a dominant feature for predicting Browser behavior as more occurrences are observed as indicated in graph 660. The contribution of the Cross-Markov feature to the overall performance was validated by analyzing how the prediction module behaves without Cross-Markov. In most cases, use of the Cross-Markov feature improves performance of the prediction module, and the Cross-Markov feature can be used to significantly improve prediction accuracy for URLs, as indicated by the area covered by Cross-Markov feature 674 in graph 660.

The Poisson feature had the lowest prediction power compared to other features, but the Poisson feature seemed to be more useful to the Dialer application than other applications. Overall, although each application has several features that provide substantial contributions to the performance of the prediction module, the rest of the features still contribute to the overall performance of the prediction module in a non-trivial way.

To gain an understanding of how the prediction module performs in comparison with other prediction techniques, the prediction module was compared with a Naïve Bayesian model used as a predictor, as mentioned above in the context of FIGS. 4 and 5.

Figure 7:
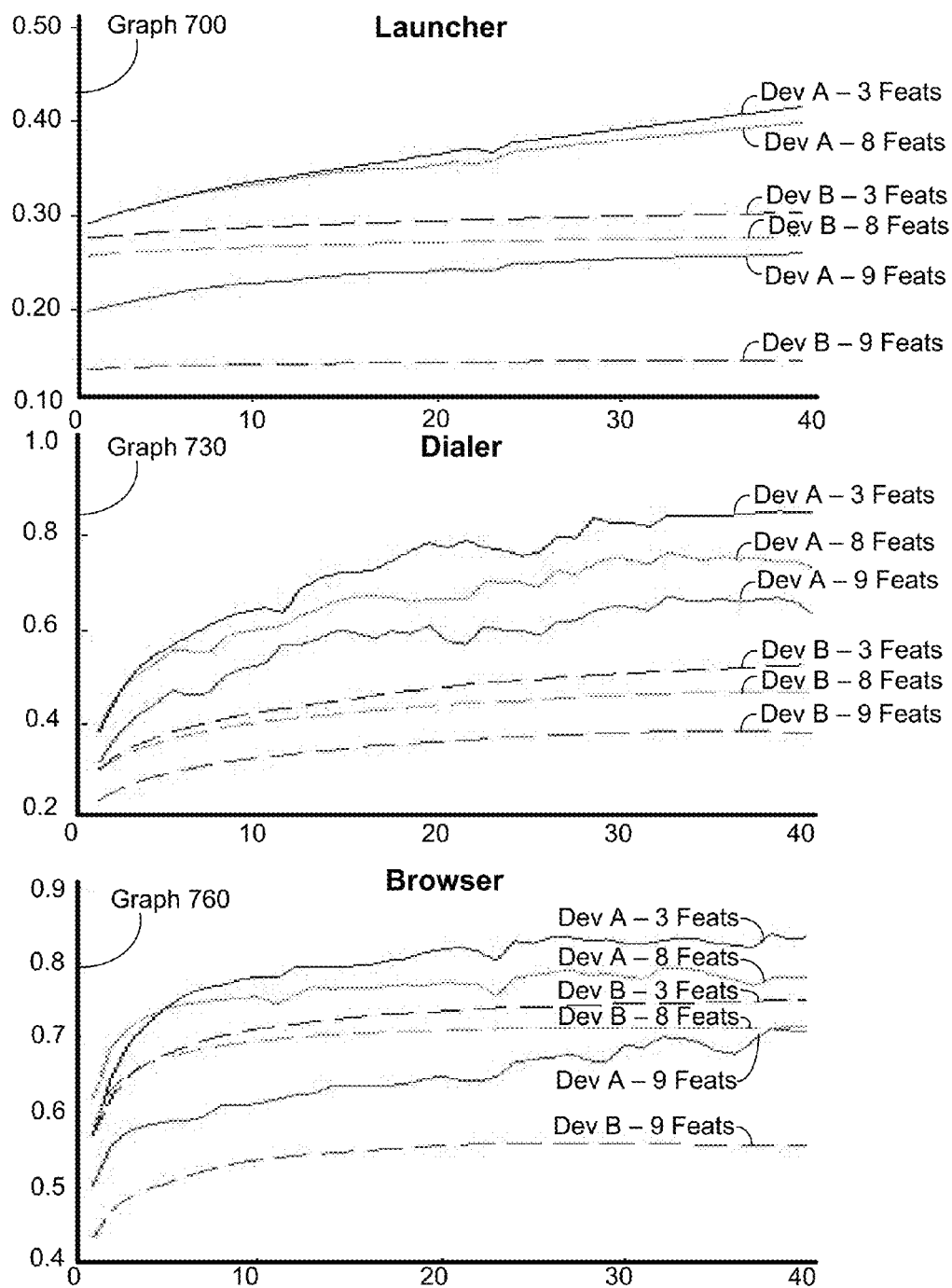
FIG. 7 shows graphs of performance of a Naïve Bayesian model in predicting launcher, dialer, and browser events, in accordance with an embodiment.

A variety of feature combinations were used for the Naïve Bayesian model. Using many features in a Naïve Bayesian model—that is more vulnerable for overfitting—generally hurts its performance based on our dataset as indicated in FIG. 7. A Naïve Bayesian model that uses Markov, Hour, and Cell-Tower features per event is a generally good predictor for Launcher, Dialer, and Browser events and has shown effective in other examples. Overall, the prediction module predictor outperformed the Naïve Bayesian for all behaviors for both Device A and Device B.

FIG. 7 shows graphs 700, 730, and 760 of Naïve Bayesian model performance in predicting respective launcher, dialer, and browser events, in accordance with an embodiment. Three feature combinations were used to test Naïve Bayesian model performance for both Devices A and B: all 9 features, 8 features, excluding Poisson, and 3 features—Markov, Hour, and Cell-Tower.

Graph 700 graphs a number of Launcher event occurrences on the X axis and a prediction accuracy on the Y axis, where prediction accuracy ranges from 0 to 1 as indicated above for FIGS. 4 and 5. Graph 700 shows performance of the Naïve Bayesian model using the 3 features, 8 features, and 9 features for Launcher events for both Device A and Device B, as discussed in the paragraph above. Similarly, graph 730 is a plot of a number of Dialer event occurrences on the X axis and a prediction accuracy on the Y axis, to indicate performance of the Naïve Bayesian model using 3 features, 8 features, and 9 features for Dialer events for both Device A and Device B. And graph 760 is a graph with a number of Browser event occurrences on the X axis and a prediction accuracy on the Y axis, to indicate performance of the Naïve Bayesian model using 3 features, 8 features, and 9 features for Dialer events for both Device A and Device B.

Although it is difficult to directly compare prediction module predictor results with previously reported results due to different datasets and experimental procedures, the results shown on FIGS. 4-7 can give a useful understanding of how the prediction module predictor behaves in comparison with a Naïve Bayesian approach in an online learning situation. A Naïve Bayesian model assumes conditional independency between features and relies on features giving probability scores, which are hard to be accurate especially with limited observations. In contrast, the prediction module predictor has fewer requirements for features and is more flexible in combining them To understand how fast the prediction module can predict and learn and how the time cost varies as the complexity increases, an example implementation of the prediction module was evaluated on a Google Nexus 5 smartphone, running Android™ Version 4.4 (KitKat), with a Qualcomm Snapdragon™ 800 2.26 GHz processor. The prediction module was tested using 31,077 predictions and training cases on the device.

The overall time complexity for both prediction and learning is linearithmic, $O(N \log N)$ in the number of unique events N. Asymptotically, the expensive portion for prediction involves sorting all the events to generate a ranking list. The asymptotically expensive portion of learning is sorting the margins between the target event and each of the non-target events. Empirically, the most time-consuming component of the example implementation was actually generating the feature vector for each event.

In practice, the number of possible events for each application can be limited. For example, choosing 100 unique events per application as an upper bound, roughly 4 ms were used to either learn from an observation or make a prediction in the example implementation. When 200 unique events were used per application—a reasonably large size for many applications, about 10 ms were used in either learning or prediction. Performance likely can be improved using better memory management techniques; e.g., caching feature results, and/or profiling the example implementation to find candidate portions of software for optimization. The energy overhead for the example implementation of the prediction module was measured using a Mosoon power meter. In the example implementation, a "query" or "send" request takes about 3 μAh of battery capacity to process and did not consume battery power at other times.

Experiments discussed above reveal that a Cross-Markov feature can bring an important contribution to the overall performance of the prediction module, especially for sparsely occurring events such as Browser and Dialer events. The Cross-Markov feature effectively addresses the sparsity of event occurrences—a major challenge for event prediction on mobile devices—by considering events that occurred in other applications as additional signals.

Although event transitions can be used without the distinction of within and cross-application transitions, factorizing event transitions as two separate Markov and Cross-Markov features allows each feature to have fewer parameters to learn which eases training. Also, having within-application (Markov) and cross-application (Cross-Markov) transitions gives the prediction module flexibility in weighing each type of transition. Leveraging cross-application event transitions likely is only feasible in a prediction module, as security and other system constraints often limit a typical application to little or no access to events related to other applications. In some embodiments, the Cross-Markov feature can account for usage and/or other features of an application, so to give appropriate weighting to both events from often-used applications and events from less-often-used applications.

Generally speaking, the prediction module does not assume specific semantics or underlying distributions of target events. Rather, the prediction module learns the relative importance of each feature over time. This allows the prediction module to serve applications whose behaviors can be unexpected. Learning feature performance enables the addition, deletion, and/or change of features used by the prediction module. For example, the prediction module can use one or more new features, such as a predictor that operates on textual content an application contributes along an event. Because each feature can be trained individually, adding, deleting, and/or changing feature(s) have little impact on prediction module architecture.

In some embodiments, the prediction module can learn and use information about patterns of events to increase prediction accuracy for specific events and applications. For example, temporal bursts have been shown highly useful for predicting usage of applications, such as games. In these embodiments, the prediction module can be enhanced to allow applications to specify such unique event patterns specific to the application. In still other embodiments, the prediction module can be used with other applications than mentioned herein; e.g., suggesting destinations for a Maps application, improving a language model for text entry.

Computing Device Architecture

Figure 8A:
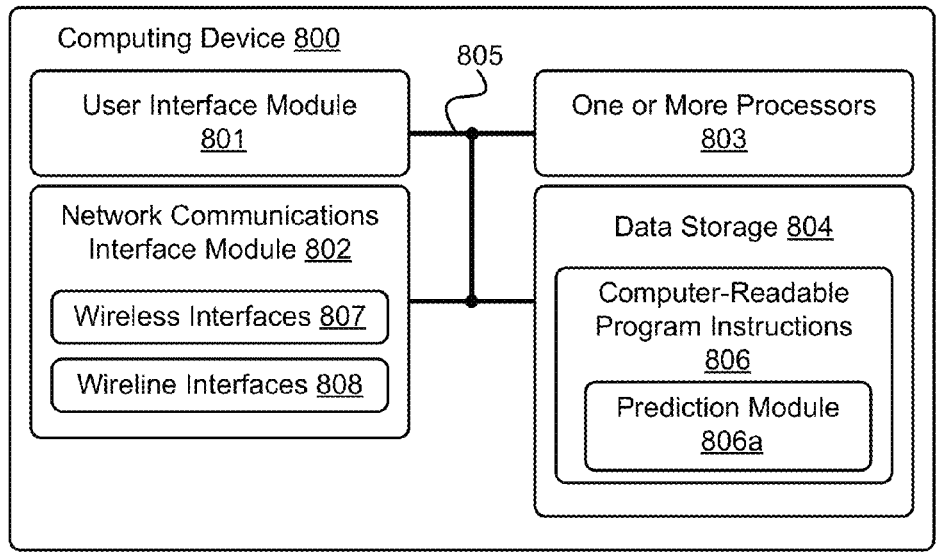
FIG. 8A is a functional block diagram of an example computing device, in accordance with an example embodiment.

FIG. 8A is a block diagram of a computing device (e.g., system) in accordance with an example embodiment. In particular, computing device 800 shown in FIG. 8A can be configured to perform one or more functions of programmable device 104a, 104b, 104c, network 106, server device 108, 110, and/or computing device 800. Computing device 800 may include a user interface module 801, a network-communication interface module 802, one or more processors 803, and data storage 804, all of which may be linked together via a system bus, network, or other connection mechanism 805.

User interface module 801 can be operable to send data to and/or receive data from external user input/output devices. For example, user interface module 801 can be configured to send and/or receive data to and/or from user input devices such as a keyboard, a keypad, a touch screen, a computer mouse, a track ball, a joystick, a camera, a voice recognition module, and/or other similar devices. User interface module 801 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 801 can also be configured to generate audible output(s), such as a speaker, speaker jack, audio output port, audio output device, earphones, and/or other similar devices.

Network-communications interface module 802 can include one or more wireless interfaces 807 and/or one or more wireline interfaces 808 that are configurable to communicate via a network, such as network 106 shown in FIG. 1. Wireless interfaces 807 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 802 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 803 can include one or more general purpose processors and/or one or more special purpose processors (e.g., digital signal processors, application specific integrated circuits, etc.). Processors 803 can be configured to execute computer-readable program instructions 806 that are contained in the data storage 804 and/or other instructions as described herein.

Data storage 804 can include one or more computer-readable storage media that can be read and/or accessed by at least one of processors 803. The one or more computer-readable storage media can include volatile and/or non-volatile storage components, such as optical, magnetic, flash memory, organic or other memory or disc storage, which can be integrated in whole or in part with at least one of processors 803. In some embodiments, data storage 804 can be implemented using a single physical device (e.g., one optical, magnetic, organic or other memory or disc storage unit), while in other embodiments, data storage 804 can be implemented using two or more physical devices. The one or more computer-readable storage media can be, or can include, one or more non-transitory computer-readable storage media.

Data storage 804 can include computer-readable program instructions 806 and perhaps additional data, such as but not limited to one or more serialization buffers, virtual tables, objects, and/or instances of objects. In some embodiments, data storage 804 can additionally include storage required to perform at least part of the herein-described methods and techniques and/or at least part of the functionality of the herein-described devices and networks.

In other embodiments, computer-readable program instructions 806 can include instructions for prediction module 806a. When instructions for prediction module 806a are executed by processor(s) 803, instructions for prediction module 806a can perform some or all of the herein-described functionality of a prediction module.

Cloud-Based Servers

Figure 8B:
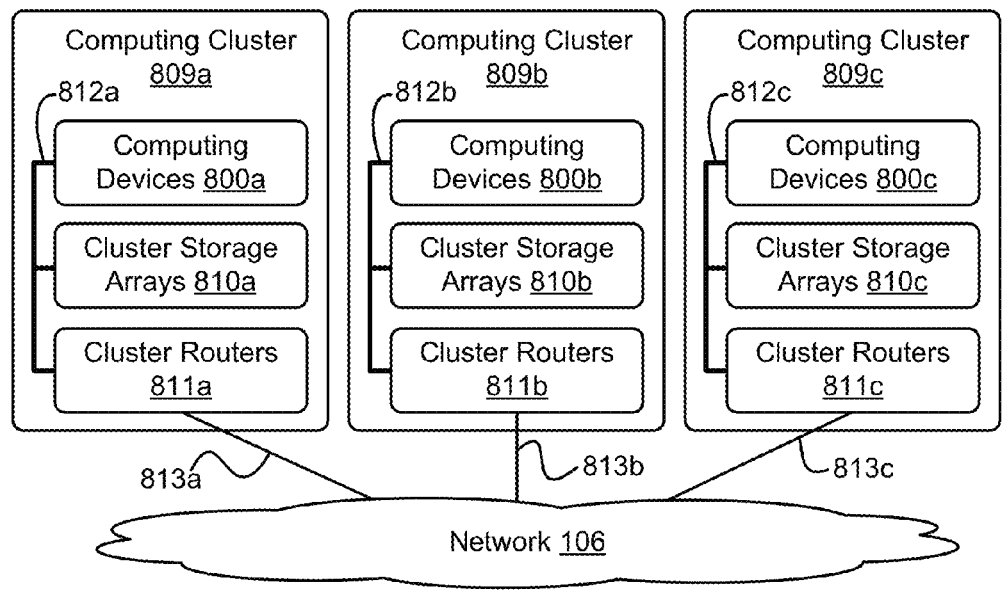
FIG. 8B depicts a cloud-based server system, in accordance with an example embodiment.

FIG. 8B depicts a network 106 of computing clusters 809a, 809b, 809c arranged as a cloud-based server system in accordance with an example embodiment. Server devices 108 and/or 110 can be cloud-based devices that store program logic and/or data of cloud-based applications and/or services. In some embodiments, server devices 108 and/or 110 can be a single computing device residing in a single computing center. In other embodiments, server device 108 and/or 110 can include multiple computing devices in a single computing center, or even multiple computing devices located in multiple computing centers located in diverse geographic locations. For example, FIG. 6 depicts each of server devices 108 and 110 residing in different physical locations.

In some embodiments, data and services at server devices 108 and/or 110 can be encoded as computer readable information stored in non-transitory, tangible computer readable media (or computer readable storage media) and accessible by programmable devices 104a, 104b, and 104c, and/or other computing devices. In some embodiments, data at server device 108 and/or 110 can be stored on a single disk drive or other tangible storage media, or can be implemented on multiple disk drives or other tangible storage media located at one or more diverse geographic locations.

FIG. 8B depicts a cloud-based server system in accordance with an example embodiment. In FIG. 8B, the functions of server device 108 and/or 110 can be distributed among three computing clusters 809a, 809b, and 809c. Computing cluster 809a can include one or more computing devices 800a, cluster storage arrays 810a, and cluster routers 811a connected by a local cluster network 812a. Similarly, computing cluster 809b can include one or more computing devices 800b, cluster storage arrays 810b, and cluster routers 811b connected by a local cluster network 812c. Likewise, computing cluster 809c can include one or more computing devices 800c, cluster storage arrays 810c, and cluster routers 811c connected by a local cluster network 812c.

In some embodiments, each of the computing clusters 809a, 809b, and 809c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 809a, for example, computing devices 800a can be configured to perform various computing tasks of server 108. In one embodiment, the various functionalities of server 108 can be distributed among one or more computing devices 800a, 800b, and 800c. Computing devices 800b and 800c in respective computing clusters 809b and 809c can be configured similarly to computing devices 800a in computing cluster 809a. On the other hand, in some embodiments, computing devices 800a, 800b, and 800c can be configured to perform different functions.

In some embodiments, computing tasks and stored data associated with server devices 108 and/or 110 can be distributed across computing devices 800a, 800b, and 800c based at least in part on the processing requirements of server devices 108 and/or 110, the processing capabilities of computing devices 800a, 800b, and 800c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 810a, 810b, and 810c of the computing clusters 809a, 809b, and 809c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 108 and/or 110 can be distributed across computing devices 800a, 800b, and 800c of computing clusters 809a, 809b, and 809c, various active portions and/or backup portions of these components can be distributed across cluster storage arrays 810a, 810b, and 810c. For example, some cluster storage arrays can be configured to store the data of server device 108, while other cluster storage arrays can store data of server device 110. Additionally, some cluster storage arrays can be configured to store backup versions of data stored in other cluster storage arrays.

The cluster routers 811a, 811b, and 811c in computing clusters 809a, 809b, and 809c can include networking equipment configured to provide internal and external communications for the computing clusters. For example, the cluster routers 811a in computing cluster 809a can include one or more internet switching and routing devices configured to provide (i) local area network communications between the computing devices 800a and the cluster storage arrays 810a via the local cluster network 812a, and (ii) wide area network communications between the computing cluster 809a and the computing clusters 809b and 809c via the wide area network connection 813a to network 106. Cluster routers 811b and 811c can include network equipment similar to the cluster routers 811a, and cluster routers 811b and 811c can perform similar networking functions for computing clusters 809b and 809b that cluster routers 811a perform for computing cluster 809a.

In some embodiments, the configuration of the cluster routers 811a, 811b, and 811c can be based at least in part on the data communication requirements of the computing devices and cluster storage arrays, the data communications capabilities of the network equipment in the cluster routers 811a, 811b, and 811c, the latency and throughput of local networks 812a, 812c, 812c, the latency, throughput, and cost of wide area network links 813a, 813b, and 813c, and/or other factors that can contribute to the cost, speed, fault-tolerance, resiliency, efficiency and/or other design goals of the moderation system architecture.

Example Methods of Operation

Figure 9:
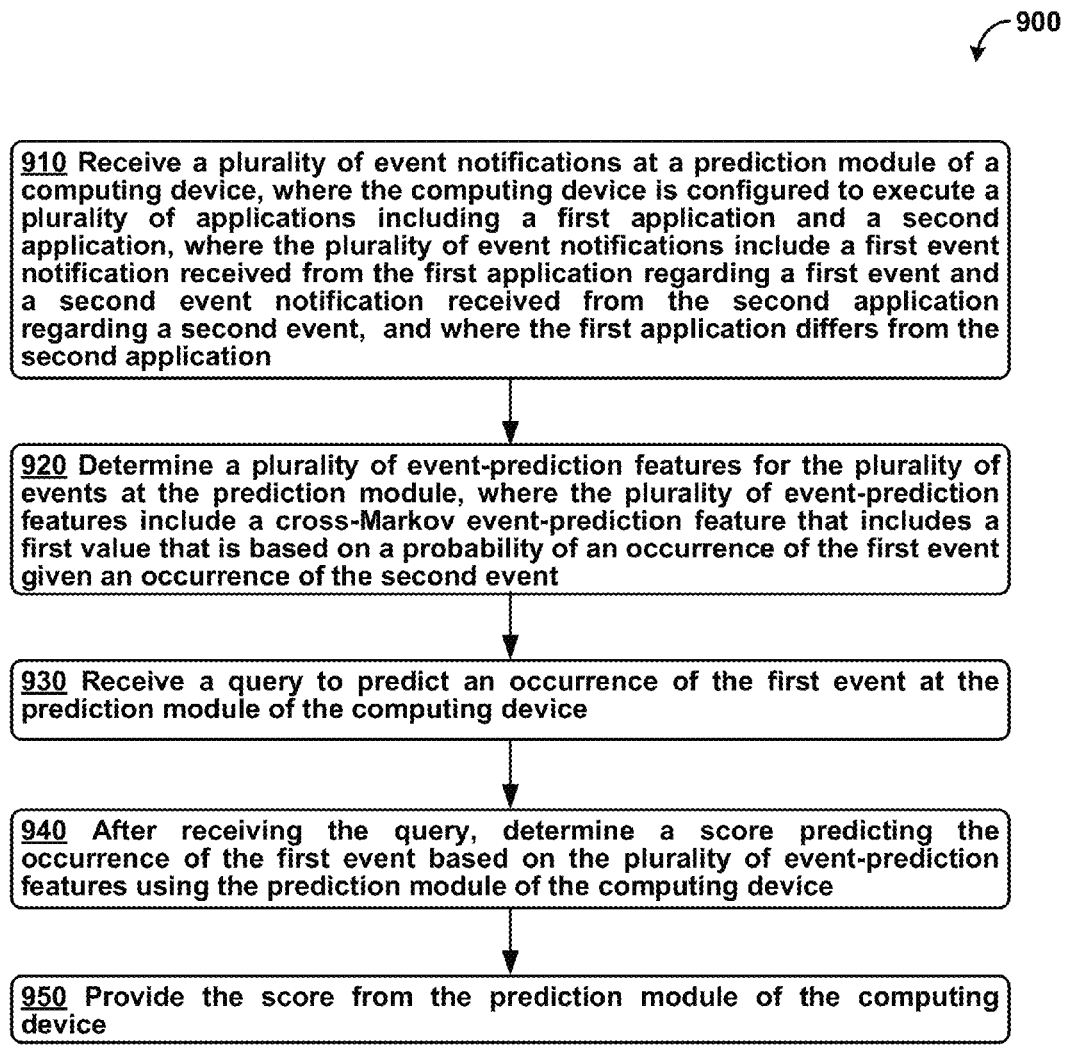
FIG. 9 is a flowchart of an example method of predicting events using computing device, in accordance with an example embodiment.

FIG. 9 is a flowchart of a method 900 storing data at a computing device. Example computing devices include, but are not limited to, herein-described programmable device 104a, 104b, 104c, network 106, server device 108, 110, and/or computing device 800.

Method 900 can begin at block 910, where a prediction module of a computing device can receive event notifications. The computing device can be configured to execute a plurality of applications that include a first application and a second application. The first and second applications can differ. The plurality of event notifications can include a first event notification received from the first application regarding a first event and a second event notification received from the second application regarding a second event.

At block 920, the prediction module of the computing device can determine a plurality of event-prediction features for the plurality of events. The plurality of event-prediction features can include a Cross-Markov event-prediction feature. The Cross-Markov event-prediction feature can include a first value that is based on a probability of an occurrence of the first event given an occurrence of the second event.

In some embodiments, the plurality of event-prediction features additionally can include at least one feature selected from the group of features consisting of a recency feature, a frequency feature, a Markov feature, a Poisson feature, a location feature, and a time feature. In particular embodiments, the recency feature can be based on a recency ranking of the first event. In other particular embodiments, the frequency feature can be based on a frequency of occurrence of the first event. In even other particular embodiments, the Markov feature can be based on a probability of the occurrence of the first event given an occurrence of a third event, where the third event is an event received from the first application. In yet other particular embodiments, the location feature includes a probability of the occurrence of the first event based on the computing device being at a predetermined location. In further other particular embodiments, the time feature can include a probability of the occurrence of the first event based on a predetermined time of day.

In other embodiments, the Cross-Markov event-prediction feature can further include a second value that is based on a probability of an occurrence of the second event given an occurrence of the first event.

At block 930, the prediction module of the computing device can receive a query to predict an occurrence of the first event.

At block 940, after receiving the query, the prediction module of the computing device can determine a score predicting the occurrence of the first event based on the plurality of event-prediction features.

In some embodiments, determining the score can include determining a sum of the plurality of event-prediction features. In particular embodiments, the sum of the plurality of event-prediction features can include a weighted sum of the plurality of event-prediction features.

At block 950, the prediction module of the computing device can provide the score.

In some embodiments, method 900 further includes: receiving a second query to predict an occurrence of the second event at the prediction module and after receiving the second query, determining a score predicting the occurrence of the second event based on the plurality of event-prediction features using the prediction module.

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's physiology, medical history, social network, social actions or activities, profession, a user's preferences, or a user's current location), or to control whether and/or how to receive content from the content server that may be more relevant to the user. In addition, certain data may be treated in one or more ways before being stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
    receiving a plurality of event notifications associated with a plurality of applications at a prediction module of a computing device, wherein the plurality of applications comprise a first application, wherein the plurality of event notifications comprise a first event notification reporting occurrence of a first event associated with the first application, and wherein the occurrence of the first event is reported based on a hierarchical naming scheme;
    determining a plurality of event-prediction features for the plurality of events at the prediction module of the computing device, wherein the plurality of event-prediction features comprise a first event-prediction feature that uses a first prediction technique to determine a first value that is based on a probability of occurrence of a second event given the first event notification and a second event-prediction feature that uses a second prediction technique to determine a second value based on the probability of occurrence of the second event given the first event notification, and wherein the first prediction technique differs from the second prediction technique;

receiving a query to predict an occurrence of the second event at the prediction module of the computing device;

after receiving the query, the prediction module:
determining a sum of at least the first value and the second value, the first value determined by the first event-prediction feature using the first prediction technique, and the second value determined by the second event-prediction feature using the second prediction technique; and
determining a score predicting the occurrence of the second event based on the sum of at least the first value and the second value; and providing the score using the prediction module of the computing device.

2. The method of claim 1, wherein determining the sum of at least the first value and the second value comprises determining a weighted sum of at least the first value and the second value by at least determining a first weight associated with the first score based on a score related to actual occurrence of the second event.

3. The method of claim 1, wherein the hierarchical naming scheme enables extraction of one or more sub-events from the first event.

4. The method of claim 1, wherein the plurality of event-prediction features comprise at least one feature selected from the group of features consisting of a recency feature, a frequency feature, a Markov feature, a Poisson feature, a location feature, and a time feature.

5. The method of claim 4, wherein the recency feature is based on a recency ranking of the first event.

6. The method of claim 4, wherein the frequency feature is based on a frequency of occurrence of the first event.

7. The method of claim 4, wherein the Markov feature is based on a probability of the occurrence of the first event given an occurrence of a third event, wherein the third event is an event associated with the first application.

8. The method of claim 4, wherein the Poisson feature is based on a probability of the occurrence of the first event based on an expected occurrence frequency of the first event.

9. The method of claim 4, wherein the location feature comprises a probability of the occurrence of the first event based on the computing device being at a predetermined location.

10. The method of claim 4, wherein the time feature comprises a probability of the occurrence of the first event based on a predetermined time of day.

11. The method of claim 1, further comprising:
receiving a second query to predict an occurrence of a third event at the prediction module; and
after receiving the second query, determining a score predicting the occurrence of the third event based on the plurality of event-prediction features using the prediction module.

12. The method of claim 1, wherein a given event-prediction feature of the plurality of event-prediction features utilizes a third value that is based on a probability of an occurrence of the second event given an occurrence of the first event.

13. A computing device, comprising:
one or more processors;
a non-transitory computer readable medium configured to store executable instructions for at least a prediction module, wherein the executable instructions, when executed by the one or more processors, cause the computing device to perform functions comprising:
receiving a plurality of event notifications associated with a plurality of applications at the prediction module, wherein the plurality of applications comprise a first application, wherein the plurality of event notifications comprise a first event notification reporting occurrence of a first event associated with the first application, and wherein the occurrence of the first event is reported based on a hierarchical naming scheme,
determining a plurality of event-prediction features for the plurality of events at the prediction module, wherein the plurality of event-prediction features comprise a first event-prediction feature that uses a first prediction technique to determine a first value that is based on a probability of an occurrence of a second event given the first event notification and a second event-prediction feature that uses a second prediction technique to determine a second value based on the probability of occurrence of the second event given the first event notification, and wherein the first prediction technique differs from the second prediction technique,
receiving, at the prediction module, a query to predict an occurrence of the second event,
after receiving the query, the prediction module:
determining a sum of at least the first value and the second value, the first value determined by the first event-prediction feature using the first prediction technique, and the second value determined by the second event-prediction feature using the second prediction technique; and
determining a score predicting the occurrence of the first event based on the sum of the at least the first value and the second value, and
providing the score using the prediction module.

14. The computing device of claim 13, wherein determining the sum of at least the first value and the second value comprises determining a weighted sum of at least the first value and the second value.

15. The computing device of claim 13, wherein the plurality of event-prediction features comprise at least one feature selected from the group of features consisting of a recency feature, a frequency feature, a Markov feature, a Poisson feature, a location feature, and a time feature.

16. The computing device of claim 13, further comprising:
receiving a second query to predict an occurrence of a third event at the prediction module; and
after receiving the second query, determining a score predicting the occurrence of the third event based on the plurality of event-prediction features using the prediction module.

17. The computing device of claim 13, wherein a given event-prediction feature of the plurality of event-prediction features utilizes a third value that is based on a probability of an occurrence of the second event given an occurrence of the first event.

18. A non-transitory computer readable medium configured to store at least executable instructions, wherein the executable instructions, when executed by one or more processors of a computing device, cause the computing device to perform functions comprising:
    receiving a plurality of event notifications associated with a plurality of applications at a prediction module of the computing device, wherein the plurality of applications comprise a first application, and wherein the plurality of event notifications comprise a first event notification reporting occurrence of a first event associated with the first application, and wherein the occurrence of the first event is reported based on a hierarchical naming scheme;
    determining a plurality of event-prediction features for the plurality of events at the prediction module, wherein the plurality of event-prediction features comprise a first event-prediction feature that uses a first prediction technique to determine a first value that is based on a probability of occurrence of a second event given the first event notification and a second event-prediction feature that uses a second prediction technique to determine a second value based on the probability of occurrence of the second event given the first event notification, and wherein the first predictor differs from the second predictor;
    receiving a query to predict an occurrence of the second event at the prediction module;
    after receiving the query, the prediction module:
        determining a sum of at least the first value and the second value, the first value determined by the first event-prediction feature using the first prediction technique, and the second value determined by the second event-prediction feature using the second prediction technique; and
        determining a score predicting the occurrence of the second event based on the sum of at least the first value and the second value; and
    providing the score using the prediction module.

19. The non-transitory computer readable medium of claim 18, wherein determining the sum of at least the first value and the second value comprises determining a weighted sum of at least the first value and the second value.

20. The non-transitory computer readable medium of claim 18, wherein a given event-prediction feature of the plurality of event-prediction features utilizes a third value that is based on a probability of an occurrence of the second event given an occurrence of the first event.

* * * * *